United States Patent [19]

Ogawa et al.

[11] Patent Number: 5,695,836
[45] Date of Patent: Dec. 9, 1997

[54] ANTISTATIC FILM AND METHOD OF MANUFACTURING THE SAME

[75] Inventors: Kazufumi Ogawa, Hirakata; Norihisa Mino, Settu; Mamoru Soga, Osaka, all of Japan

[73] Assignee: Matsushita Electric Industrial Co., Ltd., Osaka, Japan

[21] Appl. No.: 500,014

[22] Filed: Jul. 10, 1995

Related U.S. Application Data

[63] Continuation of Ser. No. 872,180, Apr. 22, 1992, abandoned.

[30] Foreign Application Priority Data

| Apr. 30, 1991 | [JP] | Japan | 3-098903 |
| Apr. 30, 1991 | [JP] | Japan | 3-098905 |
| Apr. 30, 1991 | [JP] | Japan | 3-098907 |
| Apr. 30, 1991 | [JP] | Japan | 3-098909 |
| Apr. 30, 1991 | [JP] | Japan | 3-098910 |

[51] Int. Cl.$^6$ ............................................. B32B 17/06
[52] U.S. Cl. ............... 428/34.6; 428/36.91; 428/333; 428/338; 428/420; 428/428; 428/429; 428/447; 428/448; 428/451; 428/910
[58] Field of Search ................ 428/428, 429, 428/420, 447, 446, 448, 450, 451, 333, 688, 910, 338, 694 TR, 694 BR, 469 BG, 36.91, 34.6

[56] References Cited

U.S. PATENT DOCUMENTS

| 4,210,696 | 7/1980 | Ikeda et al. | 428/212 |
| 4,761,316 | 8/1988 | Ogawa | 428/447 |
| 4,863,801 | 9/1989 | Vallarino | 428/447 |
| 4,869,948 | 9/1989 | Iida | 428/429 |
| 4,992,300 | 2/1991 | Ogawa | 428/447 |
| 5,057,339 | 10/1991 | Ogawa | 428/447 |
| 5,156,918 | 10/1992 | Marks | 428/447 |
| 5,284,707 | 2/1994 | Ogawa | 428/429 |

FOREIGN PATENT DOCUMENTS

| A-0091741 | 10/1983 | European Pat. Off. |
| A-0447603 | 9/1991 | European Pat. Off. |
| A-2410029 | 6/1979 | France |

OTHER PUBLICATIONS

World Patents Index Latest, Derwent Publications Ltd., London, GB; AN 92-061518 and JP-A-4 007 137 (Kiso Kasei Sangyo); 10 Jan. 1992 (abstract).
Chemical Abstracts, vol. 81; No. 4, Columbus, Ohio, US; Abstract No. 14557W.

*Primary Examiner*—Timothy Speer
*Attorney, Agent, or Firm*—Morrison & Foerster LLP

[57] ABSTRACT

An antistatic film comprising a chemically adsorbed film of straight chain molecules each containing a conductive group and provided on a chargeable substrate via covalent bonds each containing a Si group, said chemically adsorbed film having a conductivity of $10^{-10}$ S/cm or above. With the antistatic chemically adsorbed film according to the invention, conductive functional groups are secured via chemically adsorbed molecules and by siloxane bonds to the surface of a substrate material such as ceramics, glass, synthetic resins or synthetic fibers, a film, a plate, an display screen surface, a light-emitting tube. Thus, the film provides an antistatic effect and does not separate. In addition, this chemically adsorbed film has a thickness at the nanometer level and is thus excellently transparent, as well as capable of preventing contamination of the substrate surface due to charging thereof. The film is also excellently durable. Further, when a chemically adsorbed polymer film is formed, a high molecular density, chemically adsorbed film can be obtained.

9 Claims, 19 Drawing Sheets

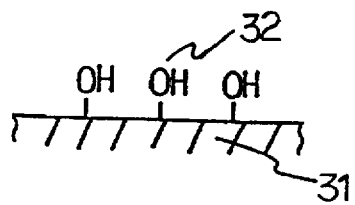
Figure-3 (a)
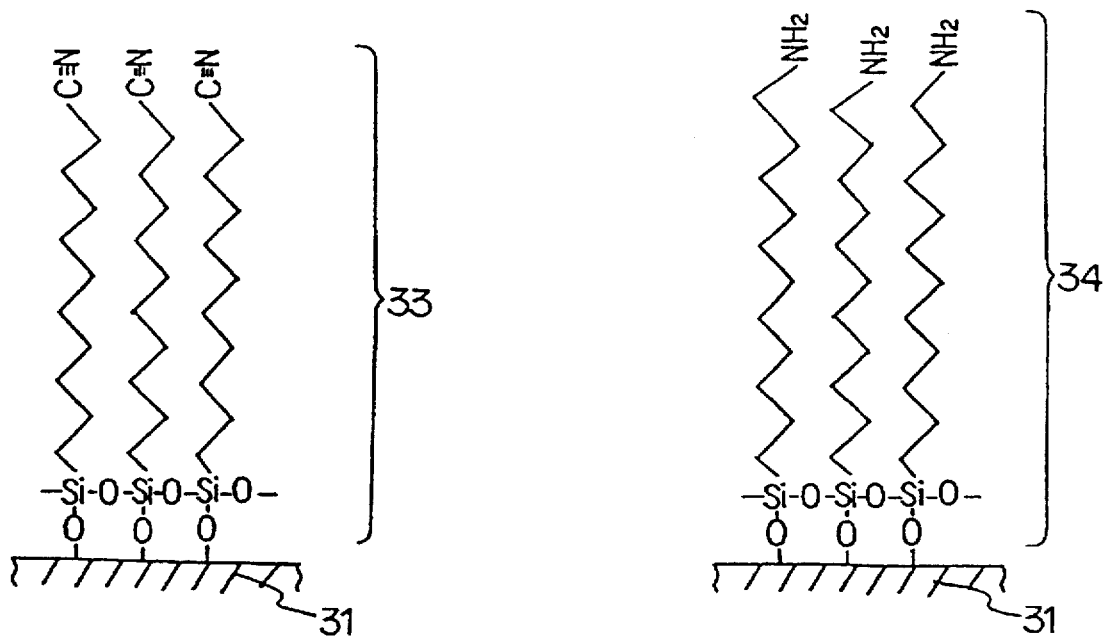
Figure-3 (b)
Figure-3 (c)

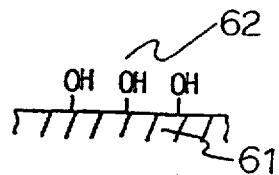
Figure-6(a)
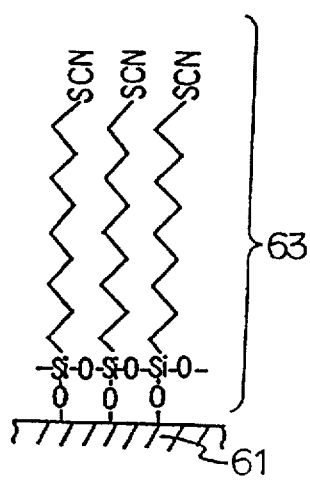
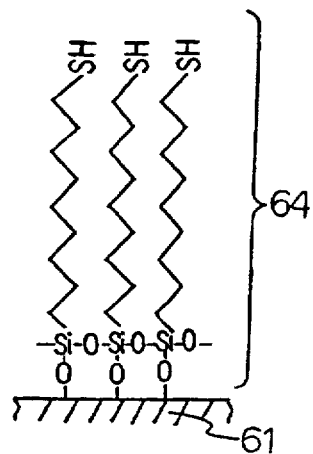
Figure-6(b)　　　　Figure-6(c)
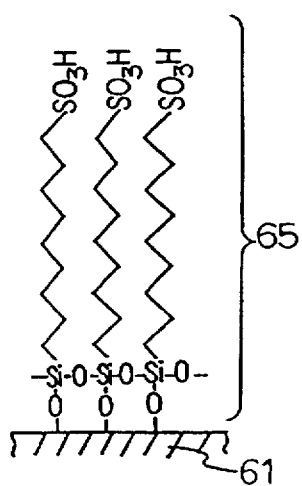
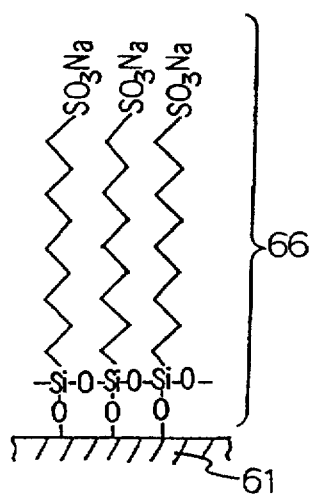
Figure-6(d)　　　　Figure-6(e)

ANTISTATIC FILM AND METHOD OF MANUFACTURING THE SAME

This application is a continuation of U.S. application Ser. No. 07/872,180, filed Apr. 22, 1992, now abandoned.

FIELD OF THE PRESENT INVENTION

The present invention relates to antistatic chemically adsorbed monomolecular films and a method of manufacturing the same. More particularly, the invention relates to antistatic chemically adsorbed monomolecular films and also a method of manufacturing the same which prevents electrical charging of ceramics, synthetic resins, glass and synthetic fibers.

BACKGROUND OF THE INVENTION

Ceramics, glass, synthetic resins, synthetic fibers and the like can electrostatically charge depending on their use. When they are charged, dust particles floating in the environment are electrostatically attracted to them and contaminate their surface. It is well known in the art that in order to prevent electrostatic charging, conductive resins are coated on, conductive films are applied to or conductive ceramics such as ITO (indium-tin oxide) are deposited on the surface of ceramics, glass, synthetic resins and the like.

Further, it is desirable to change the substrate surface antistatic, such as the surface of films, typically overhead projector films, motion picture films, video films and recording films, displays, typically VTR displays comprising electron guns, electroluminescence displays, plasma displays and liquid crystal displays, screens used for motion picture displays, projection type television sets and overhead projectors, and textile products, typically clothing and curtains. It is usually undesirable that substrates are held in close contact with one another or contaminated by dust particles in air due to electrostatic charging.

It is well known that in order to prevent this charging, a coating containing fine metal particles or carbon fibers dispersed in a resin or the like is coated on the substrate surface, or polyalkylene glycol or the like is sprayed thereon.

The prior art CRT display is made of glass, and in use it is internally irradiated with electron beams. Therefore, the display surface may be charged, and due to this charging, dust particles floating in the environment are readily attracted. To prevent electrostatic charging, it has been in practice to coat the display screen glass surface with a conductive resin or to apply a conductive film to the surface or deposit ITO (indium-tin oxide) or like conductive ceramics on the surface. It is further well known to dispose a transparent board made from a plastic plate, which has a conductive layer of ITO or the like formed on its surface, in front of the display of a word processor or a personal computer.

The prior art light-emitting tube is made of glass, and in the fluorescent tube or the like an electron beam is generated internally in use. Therefore, the surface of these tubes is very prone to electrostatic charging. With this charging, dust particles floating in the invironment are attracted to and contaminate the surface. To prevent this charging, conductive resins are coated on, conductive films are applied to or ITO (indium-tin oxide) or like conductive ceramics are deposited on the surface of the tubes.

Further, it is well known to form a chemically adsorbed monomolecular film on the surface. For example, in a method proposed by Ogawa (in U.S. Pat. No. 4,673,474 and others), a specific chemically adsorbed film is produced through chemical adsorption by preliminarily incorporating a functional group having a specific function in a surface active material.

However, using the known method of coating conductive resins or applying conductive films to the surface, results in inferior transparency, and separation or scars and scratches can occur. Using the known method of depositing ITO is costly, although it is possible to obtain high reliability. Using the method of forming a chemically adsorbed monomolecular film, it is impossible to incorporate a weakly conductive group to prevent electrostatic charging of the surface active material.

This imposes great restrictions on producing desirable antistatic chemically adsorbed films, and thus the method is poorly versatile. Further, conventional coating or spraying reduces transparency, and therefore it is difficult to use these means for transparent materials. Besides, with these means the obtainable durability is poor, and it is impossible to expect a lasting antistatic property.

SUMMARY OF THE INVENTION

An object of the invention is to provide an antistatic film, which comprises a transparent, highly durable and desirably conductive chemically adsorbed film, and also a method of manufacturing the same, for solving the problems noted above in the prior art.

According to a first aspect of the invention we provide an antistatic film comprising a chemically adsorbed film of straight chain molecules each containing a conductive group and covalently bonded to a chargeable substrate via a Si group, the chemically adsorbed film having a conductivity of $10^{-10}$ S/cm or above.

It is preferable in this invention that the chargeable substrate has a conductivity of less than $10^{-10}$ S/cm.

It is preferable in this invention that the conductive group is at least one functional group selected from the group consisting of —OH, —COOH, —NH$_2$, —N$^+$R$_3$X$^-$ (X represents a halogen atom, R represents a lower alkyl group), —NO$_2$, —SH, and —SO$_3$H groups.

It is preferable in this invention that the hydrogen atom in the —COOH or —SO$_3$H group is substituted by an alkali, an alkali earth or an other metal.

It is preferable in this invention that the chemically adsorbed film is a conductive film having a conductivity of $10^{-5}$ S/cm or above.

It is preferable in this invention that the conductive chemically adsorbed film is formed on the substrate at least via a siloxane-based chemically adsorbed inner layer film.

It is preferable in this invention that the conductive chemically adsorbed film contains π conjugated functional groups.

It is preferable in this invention that the chemically adsorbed film is a monomolecular or polymer adsorbed film.

It is preferable in this invention that the Si group is —SiO— or —SIN—.

It is preferable in this invention that the substrate is a display screen surface.

It is preferable in this invention that the substrate is a light-emitting tube.

According to a second aspect of the invention we provide a method of manufacturing an antistatic film as a chemically adsorbed film containing a conductive group on a substrate surface, comprising: (A) preparing a chargeable substrate by providing the surface of the substrate with reactive groups containing active hydrogen, subsequently contacting the substrate surface with a non-aqueous solution containing a straight chain surface active material having at least one functional group selected from the group consisting of a bromo, iodo, cyano, thiocyano and chlorosilyl group, and an ester bond, to cause a reaction between the active hydrogen at the substrate surface and the functional groups of said surface active material, and (B) reacting the functional groups which at least one conductive group selected from the group consisting of —OH, —COOH, —NH$_2$, —N$^+$R$_3$X$^-$ (X represents a halogen atom, R represents a lower alkyl group), —NO$_2$, —SH, and —SO$_3$H group.

It is preferable in this invention that the hydrogen atom in the —COOH or —SO$_3$H group is substituted by an alkali, an alkali earth or an other metal. For example, an alkali metal selected from lithium, sodium, potassium, rudidium, cesium, francium, an alkali earth metal selected from beryllium, magnesium, calsium, strontium, barium, radium, and other metals selected from chromium, manganese, iron, cobalt, nikel, copper, zirconium etc.

It is preferable in this invention that the chemically adsorbed film is a compound containing a chlorosilyl (SiCl$_n$X$_{3-n}$, n represents 1, 2 or 3, X representing a hydrogen atom, alkyl or alkoxyl group) group.

It is preferable in this invention that the substrate surface is reacted with a surface active material containing a plurality of chlorosilyl groups to form a chemically adsorbed inner layer film, and then a chemically adsorbed film containing conductive groups is formed on the chemically adsorbed inner layer film.

It is preferable in this invention that the surface active material containing a plurality of chlorosilyl groups is a member of the group consisting of SiCl$_4$, SiHCl$_3$, SiH$_2$Cl$_2$ and Cl(SiCl$_2$O)$_n$SiCl$_3$(n represents an integer).

It is preferable in this invention that the substrate, having a conductivity of less than 10$^{-10}$ S/cm, is washed and then dipped and held in a non-aqueous organic solution containing a dissolved chlorosilane-based surface active material containing a chlorosilyl group (SiCl$_n$X$_{3-n}$, n represents 1, 2 or 3, x represents H or lower alkyl or lower alkixyl group) and a functional group containing a group which forms a π conjugated system by polymerization of the group to form a chemically adsorbed film on the substrate surface, and the chemically adsorbed film is polymerized electrochemically or catalystically or by energy irradiation with light.

It is preferable in this invention that the polymerizable group forms a π conjugated system by polymerization and is at least one functional group selected from the group consisting of acetylenic, diacetylenic, pyrrolyl, thiophenyl and furanyl groups.

According to a third aspect of the invention we provide a method of manufacturing an antistatic film on a conductive substrate surface with reactive groups containing active hydrogen such that the antistatic film is chemically bonded to the substrate surface, comprising:

(a) washing the substrate, (b) contacting the substrate with an organic solution containing a chlorosilane-based surface active material with a molecular end thereof having a chlorosilane group to form a chemically adsorbed monomolecular film, and (c) providing an antistatic functional group to each end group of the chemically adsorbed monomolecular or polymer film.

It is preferable in this invention that the end group of the chlorosilane-based surface active material is an unsaturated group, and antistatic functional group is provided at each end group of the chemically adsorbed monomolecular film by converting an unsaturated bond of the end group into a hydroxyl group in an oxygen atmosphere, into amino and/or imino groups in a dry nitrogen atmosphere, or into hydroxyl, amino and/or imino groups a nitrogen atmosphere or in air, or the end groups are converted in a nitrogen atmosphere, or the end groups are converted in air by electron beam irradiation With the antistatic chemically adsorbed film according to the invention, conductive functional groups are secured via chemically adsorbed molecules and by siloxane bonds to the surface of a substrate such as ceramics, glass, synthetic resins or synthetic fibers. Thus, the film provides a charge-proof effect and does not separate. In addition, this chemically adsorbed film has a thickness at the nanometer level and is thus excellently transparent, as well as capable of preventing contamination of the substrate surface due to charging thereof and also being excellently durable. Further, when a chemically adsorbed polymer film is formed, a highly dense chemically adsorbed film can be obtained.

Further, with the preferred embodiment of the invention that the hydrophilic group is at least one functional group selected from the group consisting of the —OH, —COOH, —NH$_2$, —N$^+$R$_3$X$^-$ (X represents a halogen atom, R represents a lower alkyl group), —NO$_2$, —SH, and —SO$_3$H groups, a further excellent antistatic function can be obtained.

Further, with the preferred embodiment of the invention that the hydrogen atom of the —COOH or —SO$_3$H group is substituted by an alkali, an alkali earth or an other metal. For example, an alkali metal selected from lithium, sodium, potassium, rudidium, cesium, francium, an alkali earth metal selected from beryllium, magnesium, calsium, strontium, barium, radium, and other metals selected from chromium, manganese, iron, cobalt, nikel, copper, zirconium etc. The group is substituted by an alkali or alkali earth metal, a particularly excellent antistatic function can be obtained.

Further, in the method of manufacturing an antistatic chemically adsorbed film according to the invention, since weakly conductive functional groups are secured via chemically adsorbed molecules and by chemical bonds to the surface of a substrate of such material as ceramics, synthetic resins or synthetic fibers, there is no need of preliminarily incorporating any specific functional group in the surface active material. Thus, a chemically adsorbed monomolecular film having a desirably weak conductivity, can be produced comparatively freely for the purpose of preventing electrostatic charge.

According to the invention, since a chemically adsorbed monomolecular film is formed on the substrate surface, excellent transparency can be obtained. In addition, since the chemically adsorbed monomolecular film is chemically bonded to the substrate surface, it is excellently durable. Further, since it has a conductivity of 10$^{-10}$ S/cm or above, it is possible to realize a high peformance film having a high antistatic effect.

Further with the preferred constitution of the invention that the hydrophilic group is the —OH, —COOH, —NH$_2$, —NR$^+$X$^-$ (X represents a halogen atom, R represents a lower alkyl group), —NO$_2$, —SH, and —SO$_3$H groups, a further antistatic effect can be obtained.

Further, with the preferred embodiment of the invention that the hydrogen atom of the —COOH or —SO$_3$H group is substituted by an alkali, an alkali earth or an other metal, a further excellent antistatic function can be obtained.

Further, the antistatic light-emitting tube according to the invention has its surface covered by a chemically adsorbed monomolecular film bonded by siloxane bonds to the substrate surface, the monomolecular film having the surface thereof containing hydrophilic groups.

In this structure, the hydrophilic group is suitably the —OH, —COOH, —NH$_2$, —N$^+$R$_3$X$^-$ (X represents a halogen atom, R represents a lower alkyl group), —NO$_2$, —SH, and —SO$_3$H group.

In the above structure, the hydrogen atom in the —COOH or —SO$_3$H group is preferably substituted by an alkali metal or an alkali earth metal or an other metal.

With the above structure according to the invention, weakly conductive functional groups are secured via chemically adsorbed molecules and by siloxane bonds to the surface of the light-emitting tube. Thus, the monomolecular film provides an antistatic effect and does not separate. Besides, since the film has a thickness at the nanometer level, it will not reduce the light emission property. The film thus can prevent contamination of the fluorescent tube surface due to electrostatic charging thereof and also is excellently durable.

Further, with the preferred embodiment of the invention that the hydrophilic group is the —OH, —COOH, —NH$_2$, —N$^+$R$_3$X$^-$ (X represents a halogen atom, R represents a lower alkyl group) —NO$_2$, —SH, and —SO$_3$H group.

In the above structure, the hydrogen atom in the —COOH or —SO$_3$H group is preferably substituted by an alkali metal or an alkali earth metal or an other metal, a further excellent antistatic function can be obtained.

BRIEF DESCRIPTION OF THE DRAWINGS

FIGS. 3(a)–(c) are schematic sectional views for explaining a process of manufacture as in examples 3, 17 and 23 of the invention.

FIGS. 6(a)–(e) are schematic sectional views for explaining a process of manufacture as in examples 6 and 20 of the invention.

DETAILED DESCRIPTION OF THE INVENTION

Figure 1A:
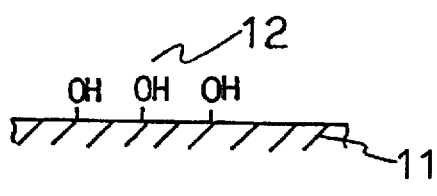
FIGS. 1(a)–(d) are schematic sectional views for explaining a process of manufacture as in examples 1, 15 and 21 of the invention.

According to the invention, antistatic functional groups are secured by chemical bonds and via chemically adsorbed molecules to a substrate surface. Thus, there is no need of incorporating in advance a particular electro conductivity group in the surface active material, and it is possible to manufacture a chemically adsorbed monomolecular film, which is antistatic to a comparatively freely controllable extent. To provide the antistatic property, a readily ionizable functional group is used as the charge-proof functional group.

More specifically, according to the invention an antistatic substrate is provided, which has a conductivity of higher than $10^{-10}$ S/cm with a chemically adsorbed monomolecular film provided on the substrate surface.

According to the invention, the chlorosilane-based surface active material capable of use to be not limited to those in the form of a straight chain as noted above. It is possible to use a branched fluorocarbon or hydrocarbon group or those having a substituted fluorocarbon or hydrocarbon group with silicon at one end (i.e., those represented by the formula R$_2$SiCl$_2$, R$_3$SiCl, R$^{11}$R$^{12}$SiCl$_2$ or R$^{11}$R$^{12}$R$^{13}$SiCl where R, R$^{11}$, R$^{12}$ and R$^{13}$ represents an fluorocarbon group or hydrocarbon group). To increase the adsorption density, however, the straight chain form is preferred.

Further, by chemically adsorbing a material for forming an inner layer material having a plurality of chlorosilyl groups, e.g., SiCl$_4$, SiHCl$_3$, SiH$_2$Cl$_2$, and Cl(SiCl$_2$O)$_n$Cl$_3$ (where n represents an integer in a range from 1 to 20), and then reacting it with water, surface chlorosilyl bonds are converted to hydrophilic silanol bonds, thus making the polymer composition hydrophilic. Among the materials containing a plurality of chlorosilyl groups, tetrachlorosilane (SiCl$_4$) is preferred in that it is highly reactive and low in molecular weight. It can, therefore, provide silanol bonds at a high density. In this way, it is possible to provide a highly hydrophilic composition compared to oxidation treatment of a polymer-containing substrate.

According to the invention, any substrate may be used which contains —OH, —COOH, —NH$_2$, =NH or other hydrophilic groups at its surface. A substrate containing relatively few hydroxyl groups at the surface, may be chemically pre-treated by means such as ozone oxidation, plasma treatment, corona treatment, or electron beam irradiation to obtain a substrate containing increased hydrophilic groups and which are suitable for the invention. Polyamide resins and polyurethane resins have surface imino groups (=NH) and therefore do not require any pre-treatment.

Since the surface active material reacts with water, the non-aqueous organic solvent to be used according to the invention may have as low a water content as possible, does not attach to the substrate and sufficiently dissolves the surface active material. Examples are those solvents which have long chain alkyl groups, aromatic hydrocarbons, saturated ring compounds and halogen-containing hydrocarbons.

The invention will be described in further detail in conjunction with examples.

The substrate used according to the invention is made of such material as ceramics, glass, synthetic resins and synthetic fibers. The surface of these substrates usually has a conductivity of $10^{-15}$ to $10^{-16}$ S/cm. If the substrate surface contains relatively few exposed hydroxyl groups, additional hydroxyl groups may be introduced into the surface through a plasma treatment or by forming a siloxane layer.

EXAMPLE 1

(introduction of a hydroxyl (—OH)group)

A glass plate substrate 11 (surface conductive value of about $10^{-17}$ S/cm, FIG. 1(a)) was prepared, washed with an organic solvent and then dipped and held for about five hours in a non-aqueous solution containing an adsorbed material having an ester (R—COOCH$_2$—, R represents a functional group) bond and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of H$_3$COOC (CH$_2$)$_7$SiCl$_3$. A dehydrochlorination reaction was thus brought about between chlorosilyl (—SiCl) groups in the material containing the ester bond and chlorosilyl groups and the hydroxyl groups 12 contained numerously at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [1]. Drying temperature may be room temperature or above.

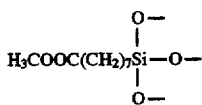
[Formula 1]

Figure 1B:
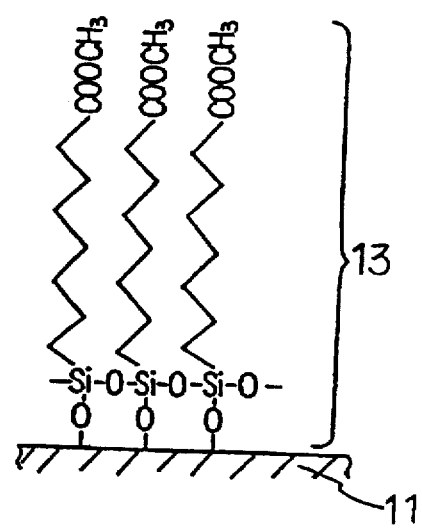

A monomolecular film 13 containing ester bonds thus was formed. The film was chemically bonded (or covalently bonded to the substrate surface. The formation of chemically adsorbed monomolecular film was confirmed by FTIR spectroscopy and the thickness was about 2.0 nm (FIG. 1(b)).

Figure 1C:
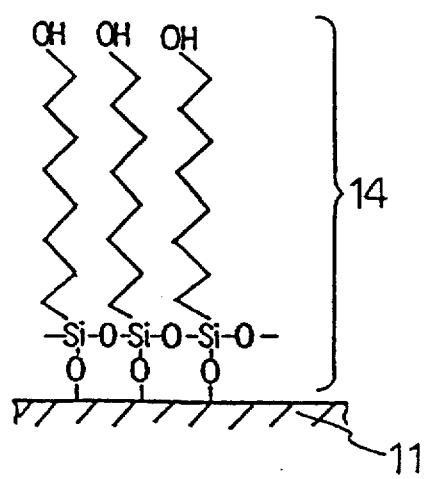

The treated substrate was then reacted in an ether solution containing several per cent by weight of lithium aluminium hydride (LiAlH$_4$) at a temperature below room temperature for 20 minutes to introduce hydrophilic hydroxyl end groups so as to form a monomolecular film 14 (FIG. 1(c)) represented by formula [2].

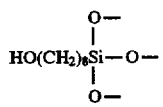
[Formula 2]

The monomolecular film 14 was very firmly chemically bonded (or covalently bonded) to the substrate and did not separate. The monomolecular film 14 was exposed to air containing water vaper (moisture), and the conductive value was about $10^{-8}$ S/cm.

Figure 1D:
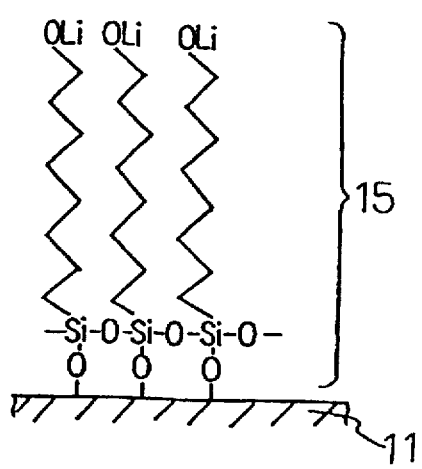

The substrate was further dipped in a hexane solution containing an organic compound of an alkali metal, e.g., 5% by weight of LiO(CH$_2$)$_3$CH$_3$ (or NaOCH$_3$) to form a very lighly hydrophilic film 15 (FIG. 1(d)) represented by formula [3]. The monomolecular film 15 was exposed to air containing water raper (moisture), and the conductive value was about $10^{-6}$ S/cm.

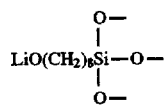
[Formula 3]

EXAMPLE 2

(introduction of a carboxyl (—COOH) group)

Figure 2A:
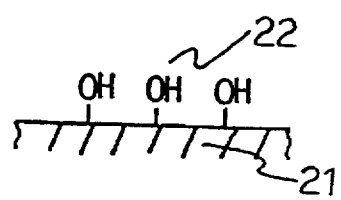
FIGS. 2(a)–(d) are schematic sectional views for explaining a process of manufacture as in examples 2, 16 and 22 of the invention.

A polypropylene plate substrate 21 (surface conductive value of about $10^{-16}$ S/cm) was prepared (FIG. 2(a)), washed well and dipped and held for about five hours in a non-aqueous solution containing an adsorbed material having an ester bond and a chlorosilyl group in a freon 113 solution containing about 2% by weight of H$_3$COOC(CH$_2$)$_{10}$SiCl$_3$. A dehydrochlorination reaction was thus brought about between chlorosilyl (—SiCl) groups in the material and the hydroxyl groups 22 numerously contained at the substrate surface. The substrate was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [4]. Drying temperature may be room temperature or above.

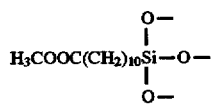
[Formula 4]

Figure 2B:
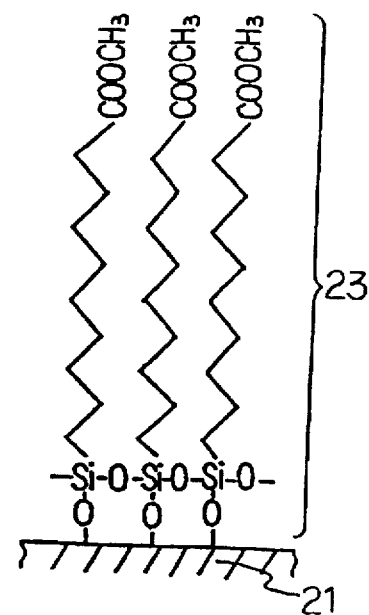

A monomolecular film 23 containing ester bonds thus could be formed. The film was chemically (or covalently) bonded to the substrate surface, and its thickness was about 2.0 nm (FIG. 2(b)).

The treated substrate were then reacted in a solution containing 36% by weight of hydrochloric acid (HCl) at 65° C. for 30 minutes, thus introducing hydrophilic carboxyl end groups as represented by formula [5].

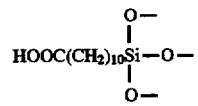
[Formula 5]

Figure 2C:
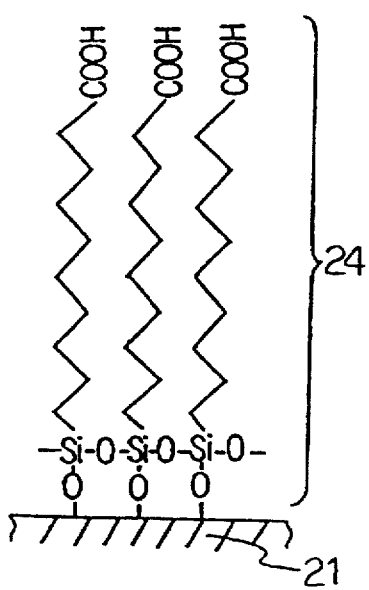

A monomolecular film 24 (FIG. 2(c)) was thus formed. The monomolecular film 24 was exposed to air containing water vaper (moisture), and the conductive value was about $10^{-9}$ S/cm. This film was very firmly chemically (or covalently) bonded and did not separate.

The substrate was then further dipped and held in an aqueous solution containing an alkali or an alkali earth or an other metal compound, e.g., NaOH (or Ca(OH)$_2$), thus, bonds were formed as in formula [6].

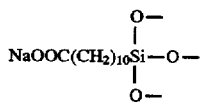
[Formula 6]

Figure 2D:
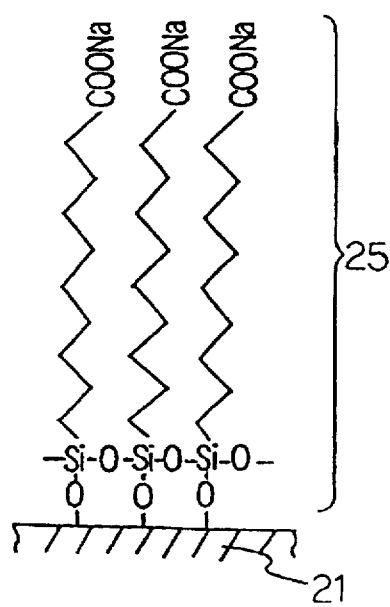

A highly hydrophilic monomolecular film 25 (FIG. 2(d)) thus could be formed on the substrate surface. The monomolecular film 24 was exposed to air containing water vaper (moisture), and the conductive value was about $10^{-6}$ S/cm. This film did not separate by scratching.

EXAMPLE 3

(introduction of an —NH$_2$ group)

A poly(butylene terephthalate) panel plate substrate 31 (FIG. 3(a)) was prepared. The substrate was dipped and held at 80° C. for about 30 minutes in a water solution containing a bichromic acid and washed with water. The substrate 31 was washed with an organic solvent, and then the substrate was dipped and held for about two hours in a non-aqueous solution containing an adsorbed material having a cyano and a chlorosilyl group, e.g., a freon 113 solution, containing about 1% by weight of NC(CH$_2$)$_{17}$SiCl$_3$.

A dehydrochlorination reaction was thus brought about between —SiCl groups in the adsorbed material containing the cyano and chlorosilyl groups and the hydroxyl groups 32 numerously contained at the substrate surfaces. The substrate was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [7]. Drying temperature may be room temperature or above.

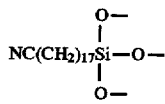
[Formula 7]

A monomolecular film 33 containing cyano groups thus was formed. The film was chemically (or covalently) bonded to the substrate surface (FIG. 3(b)).

The treated substrate was then dipped and held in ether containing dissolved lithium aluminium hydride (10 mg/ml) for overnight reaction. Then, the substrate was removed from the solution and added to an ether solution containing 10% by weight hydrochloric acid. Thereafter, the substrate was dipped and held in a triethylamine solution for two hours. The substrate was then washed with freon 113. A highly hydrophilic monomolecular film 34 (FIG. 3(c)) represented by formula [8] was formed.

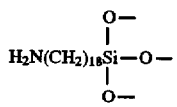
[Formula 8]

This film was firmly chemically (or covalently) bonded to the substrate and did not separate. The monomolecular film 34 was exposed to air containing water vaper (moisture), and the conductive value was about $10^{-9}$ S/cm. The formation of the chemically adsorbed monomolecular film was measured by FTIR spectrometry and the thickness was about 2.5 nm.

As another example of —NH$_2$ group introduction, a poly(butylene terephthalate) substrate was prepared, washed with an organic solvent and dipped and held for about two hours in a non-aqueous solution containing a bromo (or iodo) and a chlorosilyl group, e.g., a freon 113 solution, containing about 1% by weight of Br(CH$_2$)$_{17}$SiCl$_3$.

A dehydrochlorination reaction was thus brought about between —SiCl groups in the material containing a bromo (or iodo) and a chlorosilyl group and hydroxyl groups contained numerously at the substrate surfaces. The substrate was then washed with freon 113 to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [9]. Drying temperature may be room temperature or above.

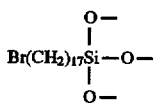
[Formula 9]

A monomolecular film containing bromo groups thus was formed over the entire substrate surface. The film was chemically (or covalently) bonded to the substrate surface. The treated substrate was then dipped and held in an N,N-dimethyl formamide solution containing dissolved sodium amide (8 mg/ml) for overnight reaction. A monomolecular film represented by formula [10] was obtained.

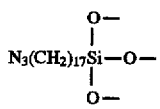
[Formula 10]

The substrate was then dipped and held in ether containing dissolved lithium aluminium hydride (10 mg/ml) for overnight reaction, and then put into an empty container for addition thereto of an ether solution containing 10% by weight hydrochloric acid. Subsequently, the substrate was dipped and held in a triethylamine solution for two hours. The substrate was then washed with freon 113 after drying as in the formula [11] was formed.

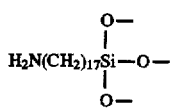
[Formula 11]

This monomolecular film was very firmly chemically (or covalently) bonded to the substrate and did not separate by wiping. The monomolecular film 34 was exposed to air containing water vapor (moisture), and the conductive value was about $10^{-9}$ S/cm.

EXAMPLE 4

[introduction of a —N$^+$R$_3$X$^-$ group (wherein X represents a halogen atom and R represents a lower alkyl group)]

An acryl resin plate substrate surface was oxygen plasma treated in a UV dry stripper ("UV-1" manufactured by Samco International Co.) at an oxygen flow rate of 1 liter/min. for 10 minutes to oxidize the surface. The substrate was dipped and held for five hours in a non-aqueous solution containing an adsorbed material having a chlorosilyl group at each end e.g., an "Aflood" solution (a fluorine-based solvent provided by Asahi Glass Co.), containing about 2% by weight of $ClSi(CH_3)_2(CH_2)_{10}SiCl_3$.

A dehydrochlorination reaction was brought about between chlorosilyl (—SiCl) groups in the material containing the chlorosilyl group at each end and the hydroxyl groups numerously contained at the substrate surface. The substrate was then washed with "Aflood" to remove unreacted material remaining on the surface. Thus, bonds formed by the formula [12] were produced over the entire substrate surface.

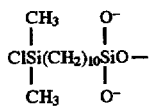

[Formula 12]

A monomolecular film 43 containing chlorosilyl groups thus was formed. The film was chemically (or covalently) bonded to the substrate surface (FIG. 4(b)). The treated substrate was then dipped in an "Aflood" solution containing 10% by weight of $(CH_3)_2N(CH_2)_2OH$ causing a dehydrochlorination reaction. The substrate was then washed with "Aflood". Thus, a monomolecular film 74 represented by formula [13] was obtained (FIG. 4(c)).

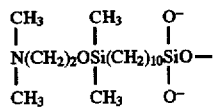

[Formula 13]

The substrate was then further dipped in an "Aflood" solution containing $CH_3I$ for two hours. Thus, a very highly hydrophilic monomolecular film 45 was obtained (FIG. 4(d)), which contained quarternary amino groups at the surface, as represented by formula [14].

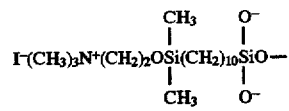

[Formula 14]

This monomolecular film was very firmly chemically (or covalently) bonded to the substrate and did not separate by wiping. The monomolecular film 45 was exposed to air containing water vapor (moisture), and the conductive value was about $10^{-7}$ S/cm.

EXAMPLE 5

(introduction of an —$NO_2$ group)

Figure 5:
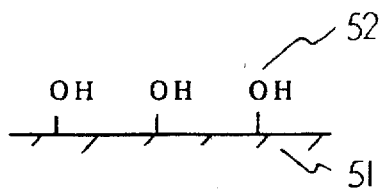
FIGS. 5(a)–(c) are schematic sectional views for explaining a process of manufacture as in examples 5, 19 and 25 of the invention.
Figure 5:
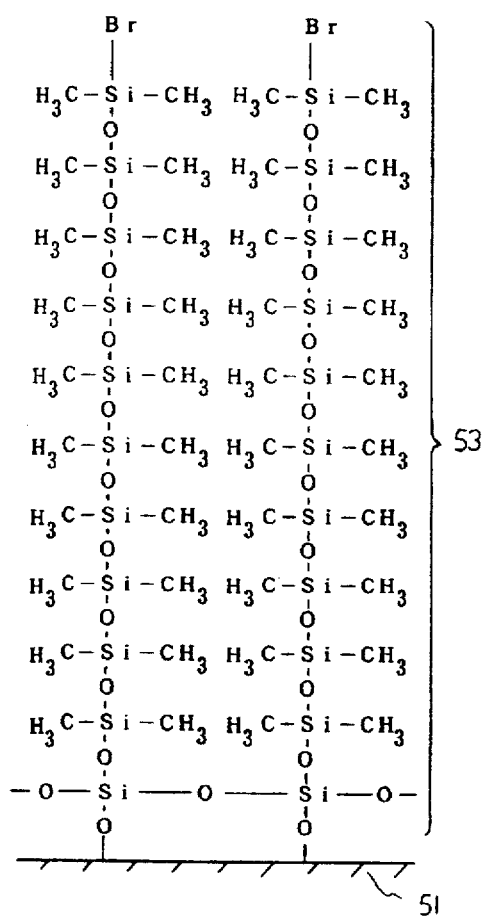
Figure 5:
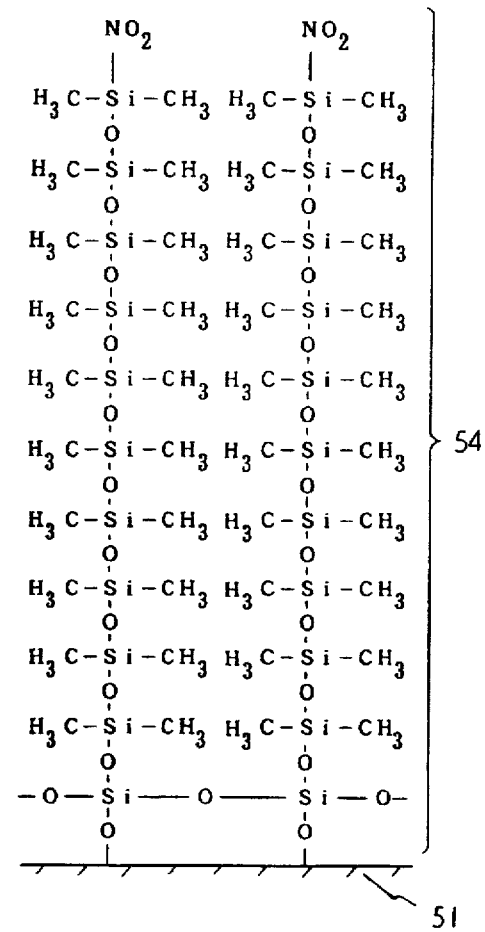

A polyester resin plate substrate 51 (FIG. 5(a)) was prepared. The substrate surface was treated with oxygen plasma in a UV dry stripper ("UV-1" manufactured by Samco International Co.) at an oxygen flow rate of 1 liter/min. for 10 minutes to oxidize the surface. The substrate was dipped and held for about five hours in a non-aqueous solution containing an adsorbed material having a bromo or iodo and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of formula [15].

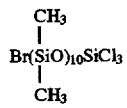

[Formula 15]

A dehydrochloroination reaction was thus brought about between chlorosilyl (—SiCl) groups in the material containing the bromo or iodo and chlorosilyl groups and the hydroxyl groups 52 numerously contained at the substrate surface. The substrate was then washed with chloroform to remove unreacted material remaining on the surface. Thus, bonds formed by formula [16] were produced over the entire substrate surface.

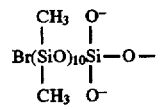

[Formula 16]

A monomolecular film 53 containing bromo groups thus was formed. The film was chemically (or covalently) bonded to the substrate surface, and its thickness was about 2.5 nm (FIG. 5(b)).

The treated substrate was then reacted in an alkaline aqueous solution containing 5% by weight of $AgNO_3$ at 80° C. for two hours. Thus, a hydrophilic monomolecular film 54 (FIG. 5(c)) represented by formula [17] could be obtained.

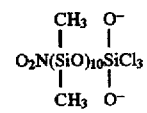

[Formula 17]

This momomolecular film was very firmly chemically (or covalently) bonded to the substrate and did not separate. The monomolecular film 54 was exposed to air containing water vapor (moisture), and the conductive value was about $10^{-10}$ S/cm.

EXAMPLE 6

(introduction of a —$SO_3H$ group)

An alumina-based ceramic containing silicon 61 (FIG. 6(a)) was prepared at a substrate. The substrate 61 was washed with an organic solvent, and was dipped and held for about two hours in a non-aqueous solution containing an adsorbed material, e.g., a mixed solution of 80% by weight of n-hexadecane (or toluene, xylene or bicyclohexyl), 12% by weight of carbon tetrachloride, and 8% by weight of choroform, containing about 2% by weight of $NCS(CH_2)_{10}SiCl_3$.

A dehydrochlorination reaction was thus brought about between —SiCl groups in the adsorbed material containing a thiocyano and a chlorosilyl group and hydroxyl groups 62 numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [18]. Drying temperature may be room temperature or above.

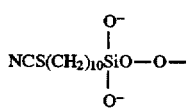

[Formula 18]

A monomolecular film 63 containing thiocyano groups thus was formed. The film was chemically (or covalently) bonded to the glass surface. Its thickness was about 2.5 nm (FIG. 6(b)).

The treated ceramic substrate was then dipped in ether containing lithium aluminum halide (10 mg/ml) for four hours. Thus, a hydrophilic monomolecular film 64 (FIG. 6(c)) represented by formula [19] was obtained.

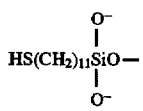

[Formula 19]

The treated ceramic substrate thus obtained was further dipped in a mixed solution containing 10% by weight of hydrogen peroxide and 10% by weight of acetic acid in a volume ratio of 1:5 at a temperature of 40° to 50° C. for 30 minutes. Thus, a highly hydrophilic monmolecular film 65 (FIG. 6(d)) as represented by formula [20] was obtained.

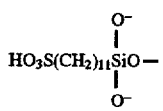

[Formula 20]

This momomolecular film was very firmly chemically (or covalently) bonded to the substrate and did not separate. The monomolecular film 65 was exposed to air containing water vaper (moisture), and the conductive value was about $10^{-8}$ S/cm.

The ceramic substrate was then further dipped and held in an aqueous solution containing an alkali or an alkali earth or an other metal compound, e.g., containing 2% by weight of NaOH (or Ca(OH)$_2$) thus, bonds were formed as in formula [21].

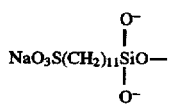

[Formula 21]

The monomolecular film 65 was exposed to air containing water vapor (moisture), and the conductive value was about $10^{-7}$ S/cm.

As has been described, in the above Examples 1 to 6 functional groups for the antistatic property are secured to the substrate surface via chemically adsorbed molecules and by chemical bonds. Thus, an antistatic chemically adsorbed monomolecular film having desirable conductivity, can be formed compratively freely on the substrate surface. Since weakly conductive functional groups are secured to the substrate surface via chemically adsorbed molecules and by chemical bonds, it is possible to prevent electrostatic charging of the substrate surface. This monomolecular film is secured by chemical bonds and does not separate. In addition, since the film has a thickness at the nanometer level, it is highly transparent. It is thus possible to preclude contamination of the substrate due to charging thereof.

EXAMPLE 7

Figure 7:
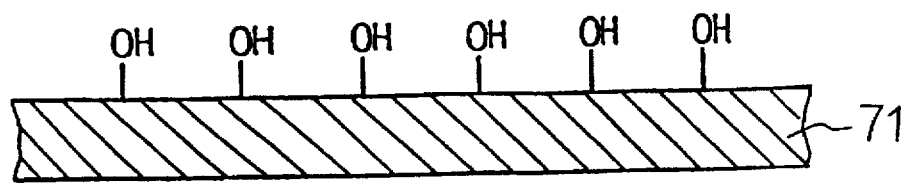
FIG. 7 is a schematic sectional view for explaining a process of manufacture as in example 7 of the invention.

An overhead projector polyester film 71 (surface conductive value was of less than $10^{-10}$ S/cm, FIG. 7) was prepared.

The substrate surface was oxygen plasma treated in a UV dry stripper ("UV-1" manufactured by Samco International Co.) at an oxygen flow rate of 1 liter/min. for 10 minutes to oxidize the surface. The substrate 71 was washed with an organic solvent, and was dipped and held for about two hours in a non-aqueous solution containing an adsorbed material having an acetylenic (ethynyl) [CH≡C—] group and a chlorosilyl group, e.g., a mixed solution of 80% by weight of n-hexadecane, 12% by weight of carbon tetrachloride and 8% by weight of choroform, containing about 2% by weight of CH≡C(CH$_2$)$_{19}$SiCl$_3$.

A dehydrochlorination reaction was thus brought about between —SiCl groups in the adsorbed material containing the ethynyl and chlorosilyl groups and the hydroxyl groups numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in the formula [22]. Drying temperature may be room temperature or above.

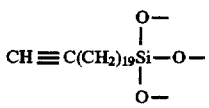

[Formula 22]

Figure 8:
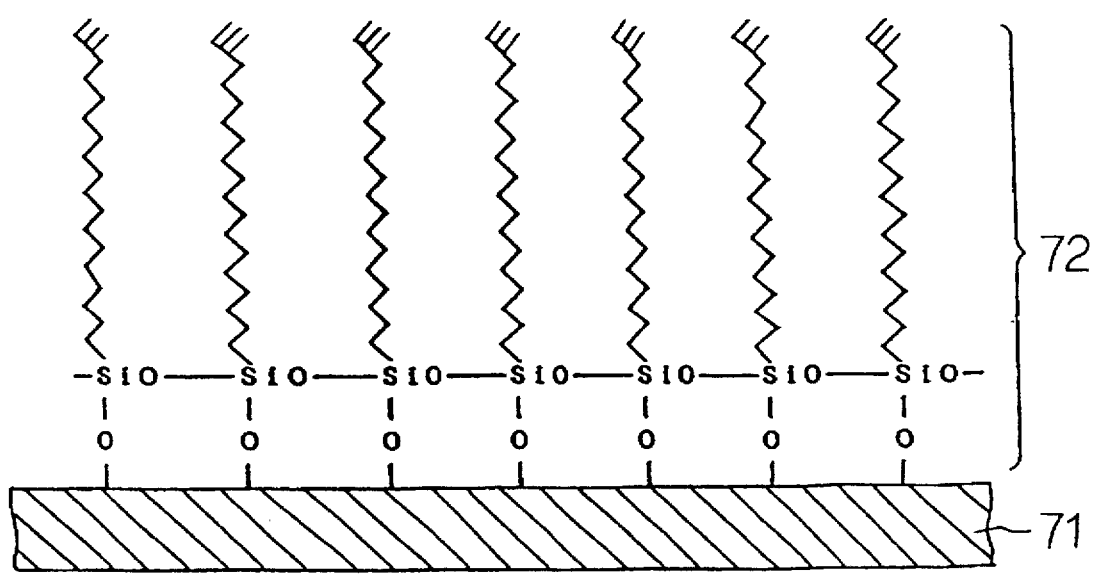
FIG. 8 is a schematic sectional view for explaining a process of manufacture as in example 7 of the invention.

A monomolecular film 72 containing ethynyl groups thus was formed. The film was chemically (or covalently) bonded to the substrate surface. Its thickness was about 2.5 nm (FIG. 8).

Figure 9:
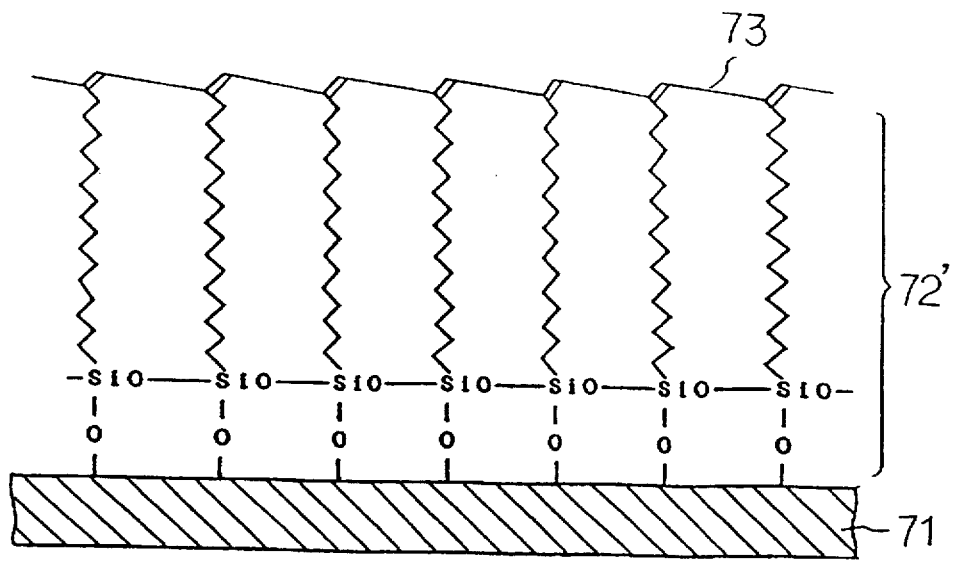
FIG. 9 is a schematic sectional view for explaining a process of manufacture as in example 7 of the invention.

Thereafter, the chemically adsorbed monomolecular film 72 was irradiated with an electron beam of about 5 Mrads. Thus, a monomolecular film 73 was obtained, as shown in FIG. 9, which contained polyacetylenic bonds produced with polymerization of adjacent ethynyl groups. The monomolecular film 72' had an electric conductivity of $10^{-5}$ S/cm or above. The monomolecular film 72' was very firmly chemically bonded (or covalently bonded) to the substrate and did not separate.

The monomolecular film containing ethynyl groups can be catalytically polymerized instead of being polymerized by electron beam irradiation. According to the catalytic polymerization process, catalysts such as tantalum chloride, molybdenum chloride can be used. The monomolecular film containing diacetylene groups can be polymerized by irradiation with an electron beam or ultraviolet rays, or by using a catalyst. The monomolecular film containing a heterocyclic group (e.g., pyrrolyl furanyl, thiophenyl groups) can be electrolytically polymerized.

EXAMPLE 8

Figure 10:
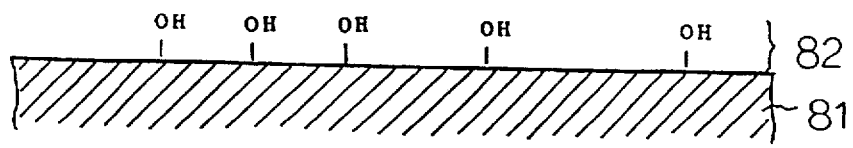
FIG. 10 is a schematic sectional view for explaining a process of manufacture as in example 8 of the invention.

An overhead projector polypropylene film 81 (surface conductive value of less than $10^{-10}$ S/cm, FIG. 10) was prepared. Where a monomolecular film is to be formed at a high density compared to that of Example 7, a film having been plasma treated is dipped and held for about 30 minutes in a freon 113 solution containing about 1 wt. % by weight of a material containing a plurality of chlorosilyl groups, e.g., SiCl$_4$, SiHCl$_3$, SiH$_2$Cl$_2$, and Cl(SiCl$_2$O)$_n$SiCl$_3$ (where n represents an integer in a range from 1 to 20), particularly SiCl$_4$, which is relatively small and highly active with respect to hydroxyl groups, thus being greatly effective in making the member surface uniformly hydrophilic. As a result, a dehydrochlorination reaction is brought about on the surface of the film 81 due to hydrophilic —OH groups 82 provided at the surface by the plasma treatment (FIG. 10). A chlorosilane monomolecular film of a material containing a plurality of trichlorosilyl groups can then be formed.

As an example, by using $SiCl_4$ as the material containing a plurality of trichlorosilyl groups, a dehydrochlorination reaction was brought about on the surface of the film 81 due to a small amount of exposed hydrophilic —OH groups. Thus, molecules represented by the formulas [23]and/or [24]:

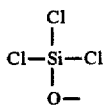
[Formula 23]

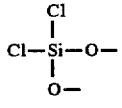
[Formula 24]

were secured to the surface via —SiO— bonds.

By subsequently washing the film with a non-aqueous solvent, e.g., freon-113, and then with water, $SiCl_4$ molecules unreacted with the member surface were removed, thus obtaining on the member surface a siloxane monomolecular film 13 as represented by formulas [25] and/or [26]:

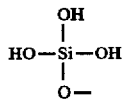
[Formula 25]

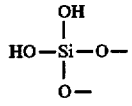
[Formula 26]

Figure 11:
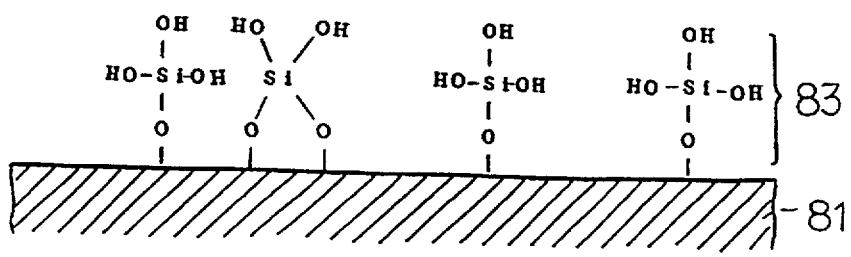
FIG. 11 is a schematic sectional view for explaining a process of manufacture as in example 8 of the invention.

The monomolecular inner layer film 83 thus formed was perfectly bonded to the member surface via chemical bonds of —SiO— and did not separate (FIG. 11).

The above washing step with the freon 113 was omitted, and a siloxane-based polymer film was adsorbed to the substrate. The siloxane-based polymer film was in satisfactorily close contact with the substrate.

The monomolecular film was completely bonded by chemical bonds of —SiO— to the part surface and did not separate. In addition, its surface contained numerous silanol (—SiOH) bonds corresponding to about three times the initial number of hydroxyl groups.

Thereafter, the substrate was washed with an organic solvent, and was dipped and held for about one hour in a non-aqueous solution containing an adsorbed material having an ethynyl [CH≡C—] group and a chlorosilyl group, e.g., a mixed solution of 80% by weight of n-hexadecane (or toluene, xylene or bicyclohexyl), 12% by weight of carbon tetrachloride, and 8% by weight of choroform, containing about 2% by weight of $CH\equiv C(CH_2)_{19}SiCl_3$.

A dehydrochlorination reaction was thus brought about between —SiCl groups in the adsorbed material containing the ethynyl and chlorosilyl groups and the hydroxyl groups numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as above in formula [22]. Drying temperature may be room temperature or above.

Figure 12:
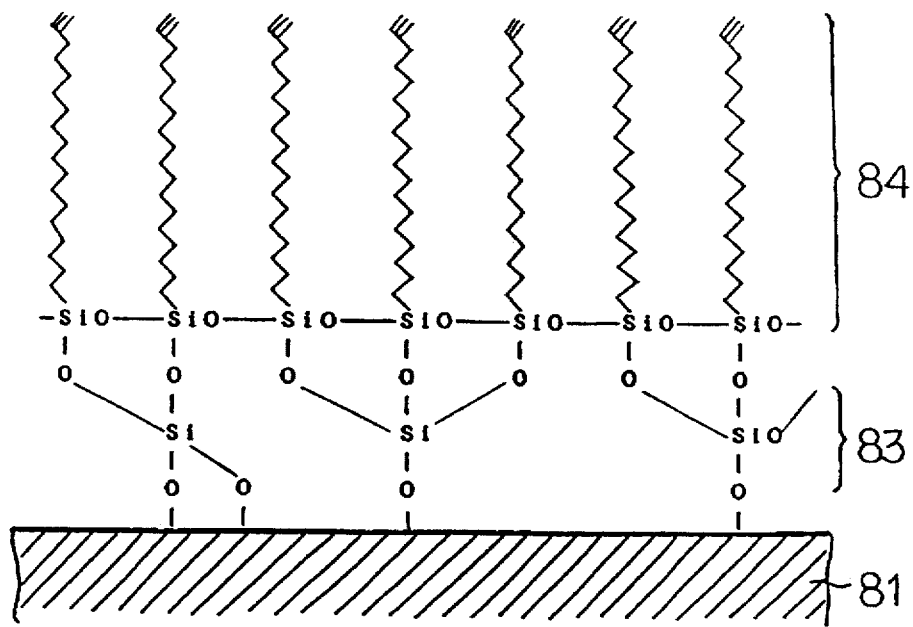
FIG. 12 is a schematic sectional view for explaining a process of manufacture as in example 8 of the invention.

A monomolecular film 84 containing ethynyl groups thus was formed. The film was chemically (or covalently) bonded to the substrate surface. Its thickness was about 2.5 nm (FIG. 12).

Figure 13:
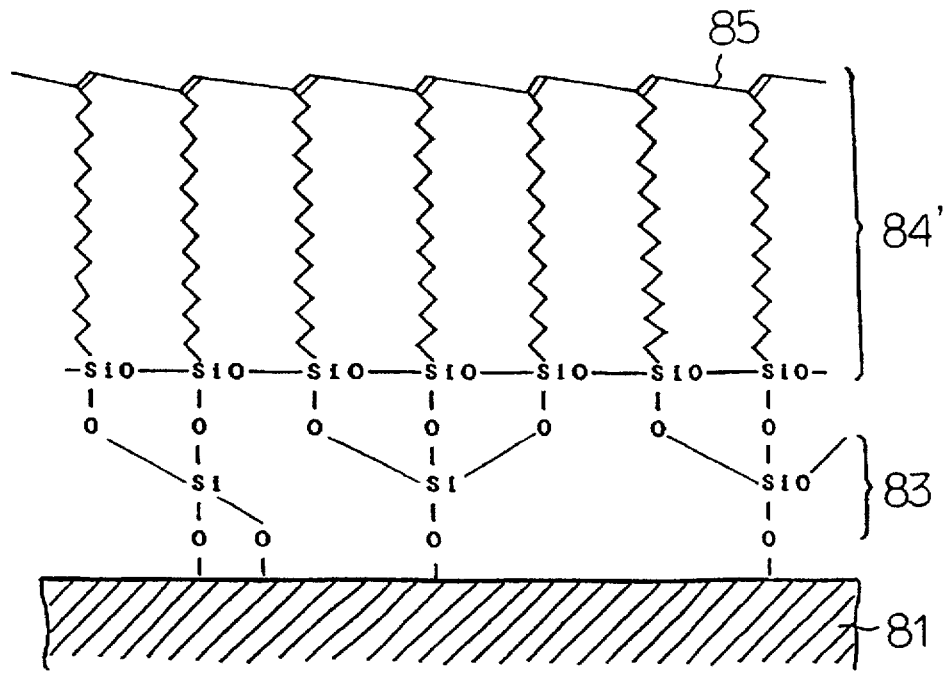
FIG. 13 is a schematic sectional view for explaining a process of manufacture as in example 8 of the invention.

Subsequently, the chemically adsorbed monomolecular film 84 was irradiated with electron beam of about 10 Mrads in a helium atmosphere. Thus, a monomolecular film 84' was obtained, as shown in FIG. 13, which contained polyacetylenic bonds 85 produced by polymerization of adjacent ethynyl groups. The monomolecular film 84' had an electric conductivity of $10^{-5}$ S/cm or above. The monomolecular film 84' was very firmly chemically bonded (or covalently bonded) to the substrate and did not separate.

The monomolecular film containing ethynyl groups can be catalytically polymerized instead of being polymerized by electron beam irradiation. According to the catalytic polymerization process, catalysts such as tantalum chloride and molybdenum chloride can be used. The monomolecular film containing diacetylene groups can be polymerized by irradiation with an electron beam or ultraviolet rays, or by using catalyst. The monomolecular film containing a heterocyclic group (e.g., pyrrolyl, furanyl, thiophenyl groups) can be use electrolytically polymerized.

As in the above Examples 7 and 8, hydrocarbon chlorosilane-based surface active material with the molecules thereof containing π conjugated functional group such as acetylenic, diacetylenic, pyrrolyl, thiophenyl and furanyl groups is dissolved in a non-aqueous solvent, and the substrate surface containing hydrophilic active groups is contacted with the solution thus obtained, whereby the surface active material is chemically bonded to the substrate surface via silanol groups. By subsequently washing away excess surface active material, a conductive chemically adsorbed monomolecular film having a thickness at a nanometer level can be formed. According to the invention, a hydrocarbon-based monomolecular film having a thickness at the nanometer level is formed on the surface of a substrate, typically an overhead projector film without reducing the intrinsic transparency of the substrate. In addition, the film is excellently antistatic and permits a great reduction in maintenance. Further, since a chemically adsorbed monomolecular film is formed on the substrate surface, excellent transparency can be obtained. In addition, since the chemically adsorbed monomolecular film is chemically bonded to the substrate surface, it is excellently durable. Besides, since the chemically adsorbed monomolecular film has a conductivity of $10^{-5}$ S/cm, it is possible to realize a highly antistatic high performance film.

EXAMPLE 9

Figure 14A:
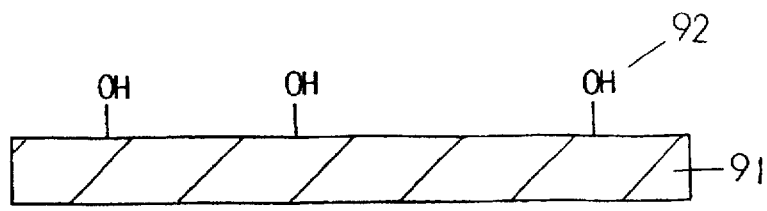
FIGS. 14(a)–(c) are schematic sectional views for explaining a process of manufacture as in example 9 of the invention.

An overhead projector polyester film 81 (surface conductive value of less than $10^{-10}$ S/cm, FIG. 14(a)) was prepared. Where a monomolecular film is to be formed at a high density compared to that of Example 7, a film having been plasma treated is dipped and held for about 30 minutes in a freon 113 solution containing about 1 wt. % of a material containing a plurality of chlorosilyl groups, e.g., $SiCl_4$, $SiCHl_3$, $SiH_2Cl_2$, and $Cl(SiCl_2O)_nSiCl_3$ (where n represents an integer in a range from 1 to 20), particularly $Cl(SiCl_2O)_nSiCl_3$, which is relatively small and highly active with respect to hydroxyl groups, thus being greatly effective in making the member surface uniformly hydrophilic. As a result, a dehydrochlorination reaction is brought about on the surface of the film 91 owing to hydrophilic —OH groups 92 provided at the surface by the plasma treatment. A chlorosilane monomolecular film of a material containing a plurality of trichlorosilyl groups can then be formed.

As an example, by using $Cl(SiCl_2O)_nSiCl_3$ (where n=2) as the material containing a plurality of trichlorosilyl groups, a dehydrochlorination reaction was brought about on the surface of the film 91 due to a small amount of exposed hydrophilic —OH groups. Thus, molecules represented by the formulas [27] and/or [28]:

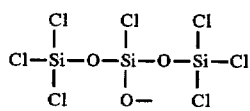
[Formula 27]

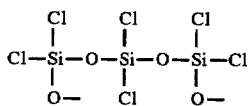
[Formula 28]

were secured to the surface via —SiO— bonds. By subsequently washing the film with a non-aqueous solvent, e.g., freon-113, and then with water, $Cl(SiCl_2O)_2SiCl_3$ molecules unreacted with the member surface were removed, thus obtaining on the member surface a siloxane monomolecular film 93 as represented by formulas [29] and/or [30]:

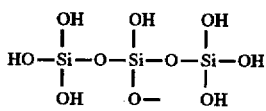
[Formula 29]

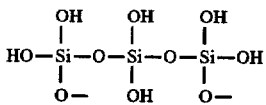
[Formula 30]

Figure 14B:
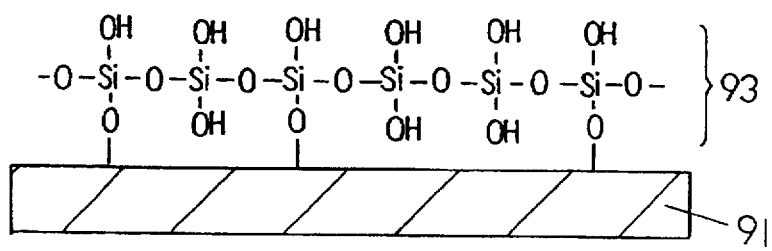

The monomolecular inner layer film 93 thus formed was perfectly bonded to the member surface via chemical bonds of —SiO— and did not separate (FIG. 14(b)).

The monomolecular film was completely bonded by chemical bonds of —SiO— to the part surface and did not separate. In addition, its surface contained numerous silanol (—SiOH) bonds corresponding to about 6.5 times the initial number of hydroxyl groups.

Thereafter, the substrate was washed with an organic solvent, and was dipped and held for about one hour in a non-aqueous solution containing an adsorbed material having a chlorosilyl group, a dimethylsilane group and a hydrocarbon chain, e.g., a mixed solution of 80% by weight of n-hexadecane (or toluene, xylene or bicyclohexyl), 12% by weight of carbon tetrachloride, and 8% by weight of choroform, containing about 3% by weight of $HSi(CH_3)_2(CH_2)_{19}SiCl_3$.

A dehydrochlorination reaction was thus brought about between —SiCl groups in the adsorbed material containing the ethynyl and chlorosilyl groups and the hydroxyl groups numerously contained at the monomolecular inner layer film 93. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as in formula [31]. Drying temperature may be room temperature or above.

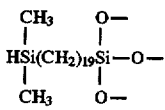
[Formula 31]

Figure 14C:
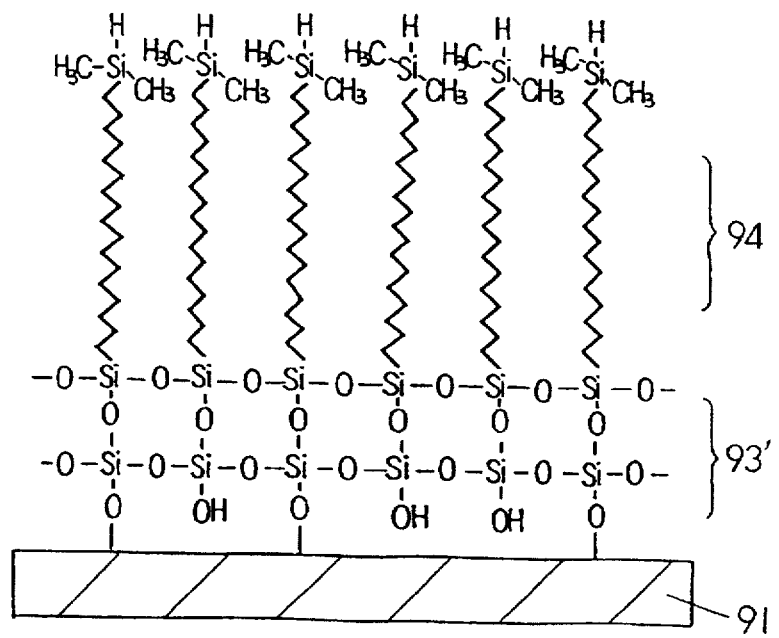

A monomolecular film 94 was formed. The film was chemically (or covalently) bonded to the substrate surface. Its thickness was about 2.5 nm (FIG. 14(c)).

Figure 15:
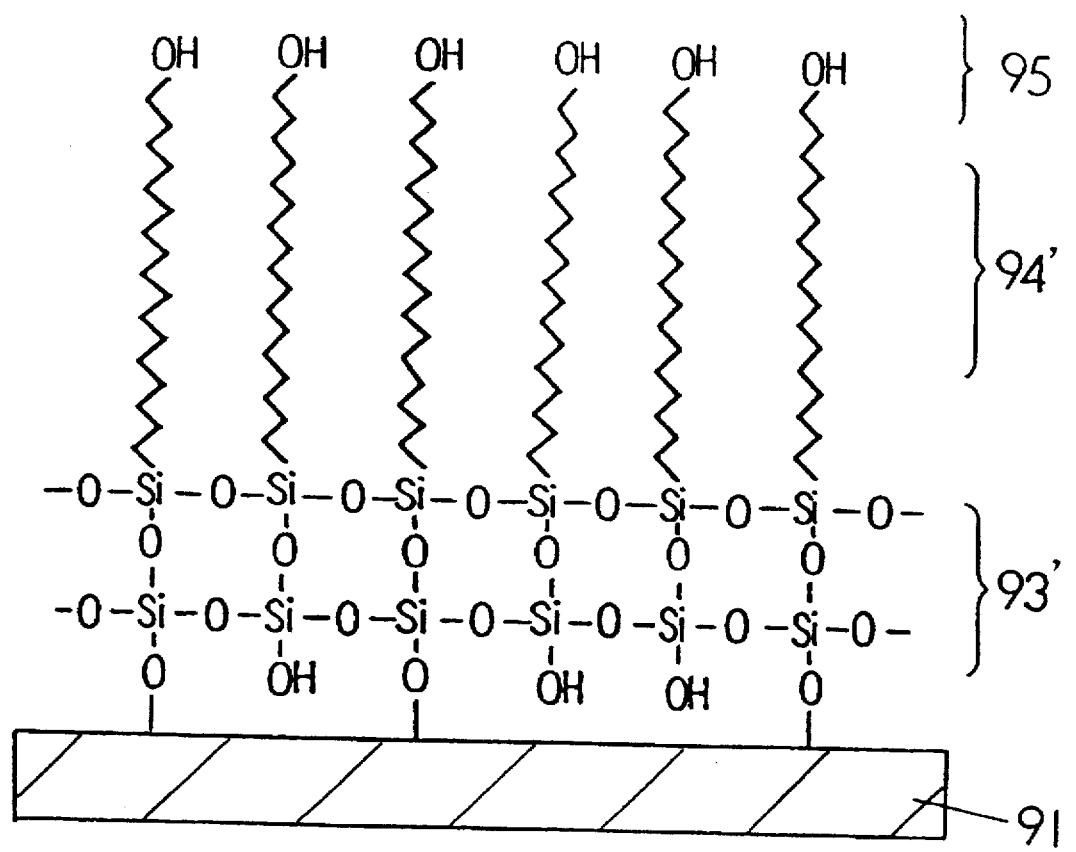
FIG. 15 is a schematic sectional view for explaining a process of manufacture as in example 9 of the invention.

Subsequently, the chemical adsorbed monomolecular film 94 was treated by oxidation with hydrogen peroxide. The oxidation solution was prepared by dissolving 250 mg of potassium hydrogencarbonate in tetrahydrofuran and adding 25 ml of hydrogen peroxide (net 30 wt. %). The substrate was dipped and held in the oxidation solution at room temperature for 10 hrs. Thus, a laminated monomolecular film (93' and 94') having a highly hydrophilic group 95 (FIG. 15) as represented by formula [32] was obtained.

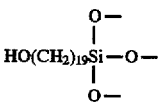
[Formula 32]

This laminated monomolecular film was very firmly chemically (or covalently) bonded to the substrate and did not separate. The laminated monomolecular film (93' and 94') was exposed to air containing water vapor (moisture), and conductive value was about $10^{-8}$ S/cm.

EXAMPLE 10

Figure 16A:
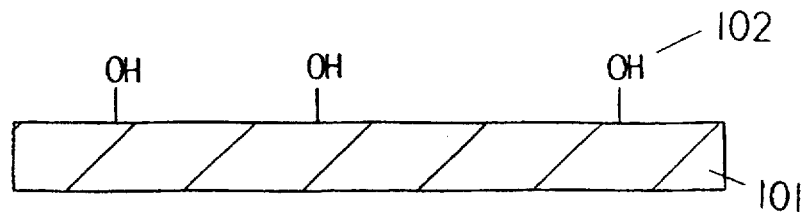
FIGS. 16(a)–(c) are schematic sectional views for explaining a process of manufacture as in example 10 of the invention.
Figure 16B:
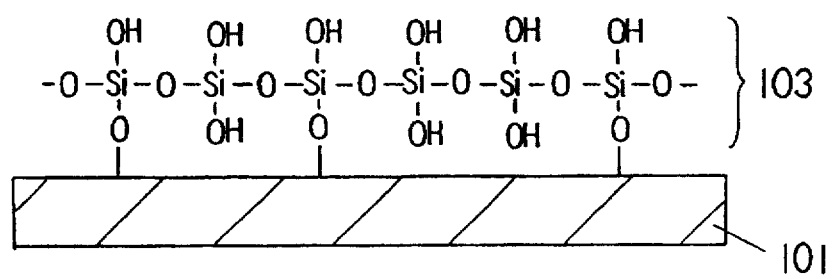

An overhead projector polyester film 101 (surface conductive value of less than $10^{-10}$ S/cm, FIG. 16(a)) was prepared. Where a monomolecular film is to be formed at a high density compared to that of Example 7, a film having been plasma treated is dipped and held for about 30 minutes in a freon 113 containing 1% by weight of a $Cl(SiCl_2O)_2SiCl_3$ as the material containing a plurality of trichlorosilyl groups, a dehydrochlorination reaction was brought about on the surface of the film 102 due to a small amount of exposed hydrophilic —OH groups. Thus, molecules represented above in formulas [27] and/or [28] were secured to the surface via —SiO— bonds. By subsequently washing the film with a non-aqueous solvent, e.g., freon-113, and then with water, $Cl(SiCl_2O)_2SiCl_3$ molecules unreacted with the member surface were removed, thus obtaining on the member surface a siloxane monomolecular film 103 as represented above in formulas [29] and/or [30]. The monomolecular inner layer film 103 thus formed was perfectly bonded to the member surface via chemical bonds of —SiO— and did not separate (FIG. 16(b)).

The monomolecular film was completely bonded by chemical bonds of —SiO— to the part surface and did not separate. In addition, its surface contained numerous silanol (—SiOH) bonds corresponding to about 6.5 times the initial number of hydroxyl groups.

Thereafter, the substrate was washed with an organic solvent, and was dipped and held for about one hour in a non-aqueous solution containing an adsorbed material having a chlorosilane group, a dimethylsilane group, and a hydrocarbon chain, e.g., a mixed solution containing 80% by weight of n-hexadecane (or toluene, xylene or bicyclohexyl), 12% by weight of carbon tetrachloride and 8% by weight of choroform, containing about 3% by weight of $HSi(CH_3)_2(CH_2)_{19}SiCl_3$.

Figure 16C:
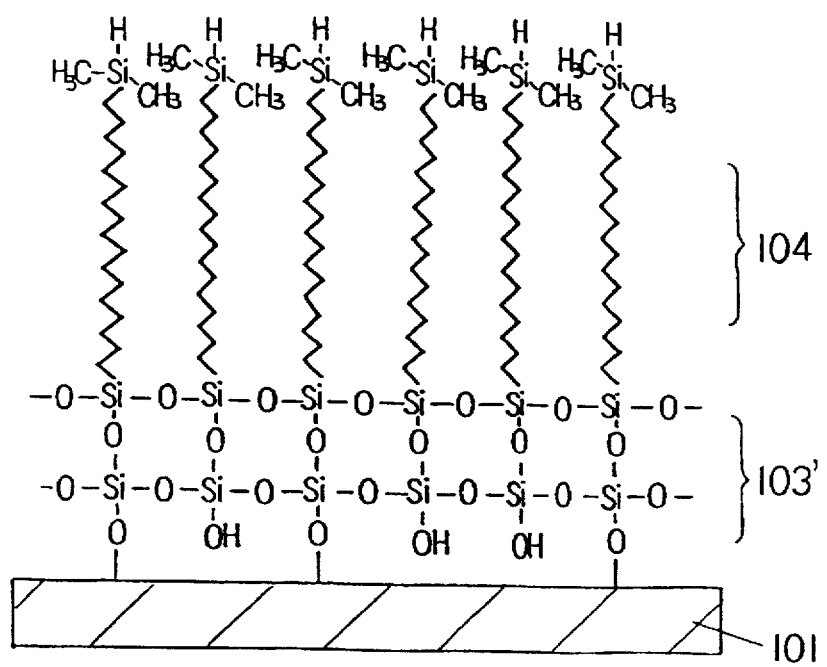

A dehydrochlorination reaction was thus brought about between —SiCl groups in the adsorbed material containing the ethynyl and chlorosilyl groups and the hydroxyl groups numerously contained at the monomolecular inner layer film 103. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as above in formula [31]. Drying temperature may be room temperature or above. A monomolecular film 104 was formed. The film was chemically (or covalently) bonded to the substrate surface. Its thickness was about 2.5 nm (FIG. 16(c)).

Figure 17:
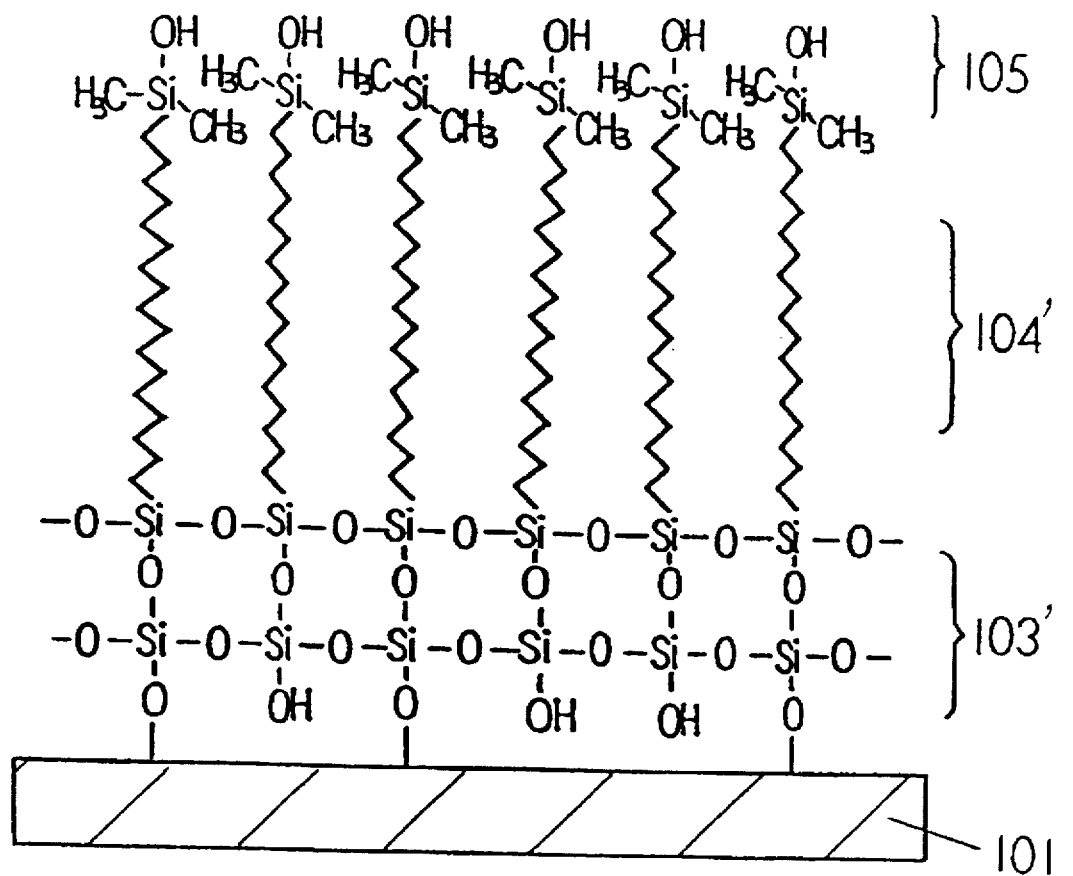
FIG. 17 is a schematic sectional view for explaining a process of manufacture as in example 10 of the invention.

Subsequently, the chemically adsorbed monomolecular film 104 was treated by an alkali treatment. The alkali treatment solution containing about 1% by weight of tetramethylammonium hydroxide in an aqueous solution. The substrate was dipped and held in the alkali solution at a room temperature for 10 minutes. Thus, a laminated monomolecular film (103' and 104') having a highly hydrophilic group 105 (FIG. 17).

This laminated monomolecular film was very firmly chemically (or covalently) bonded to the substrate and did not separate. The laminated monomolecular film (103' and 104') was exposed to air containing water vapor (moisture), and the conductive value was about $10^{-8}$ S/cm.

EXAMPLE 11

Figure 18A:
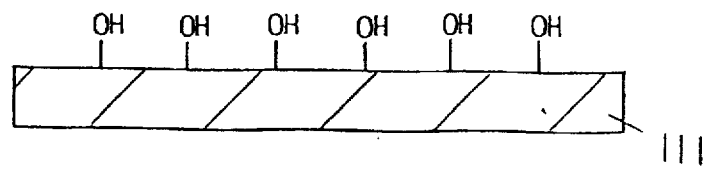
FIGS. 18(a)–(c) are schematic sectional views for explaining a process of manufacture as in example 11 of the invention.
Figure 18B:
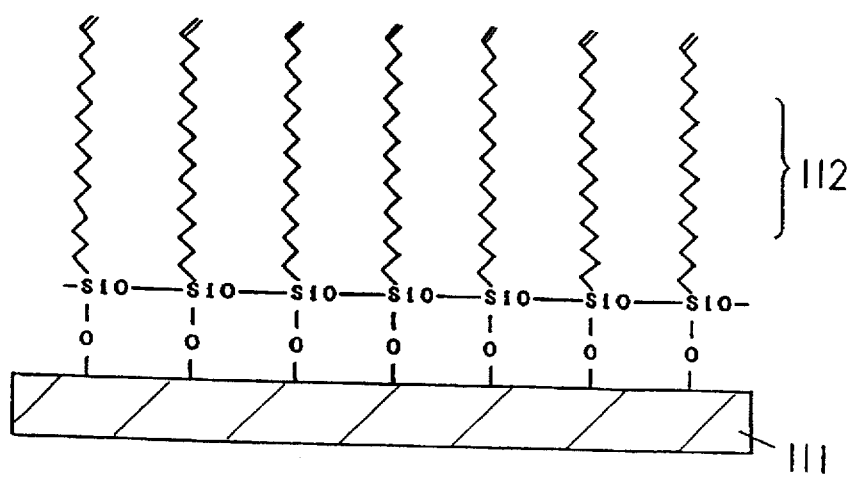

An overhead projector polyester film 111 (surface conductive value of less than $10^{-10}$ S/cm, FIG. 18(a)) was prepared. The substrate thus obtained was oxygen plasma treated in a UV dry stripper ("UV-1" manufactured by Samco International Co.) at an oxygen flow rate of 1 liter/min. for 10 minutes to oxidize the surface. Thereafter, the substrate was washed with an organic solvent, and was dipped and held for about two hours in a non-aqueous solution containing an adsorbed material having a chlorosilane group, a vinyl group ($H_2C=CH-$), and a hydrocarbon chain, e.g., a mixed solution containing 80% by weight of n-hexadecane, 12% by weight of carbon tetrachloride and 8% by weight of choroform, containing about 3% by weight of $H_2C=CH-(CH_2)_{19}SiCl_3$.

A dehydrochlorination reaction was thus brought about between —SiCl groups in the adsorbed material containing the ethynyl and chlorosilyl groups and the hydroxyl groups numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as shown in formula [32]. Drying temperature may be room temperature or above.

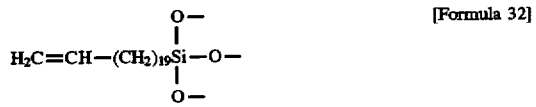

[Formula 32]

monomolecular film 112 was formed. The film was chemically (or covalently) bonded to the substrate surface. Its thickness was about 2.5 nm (FIG. 18(c)).

Figure 18C:
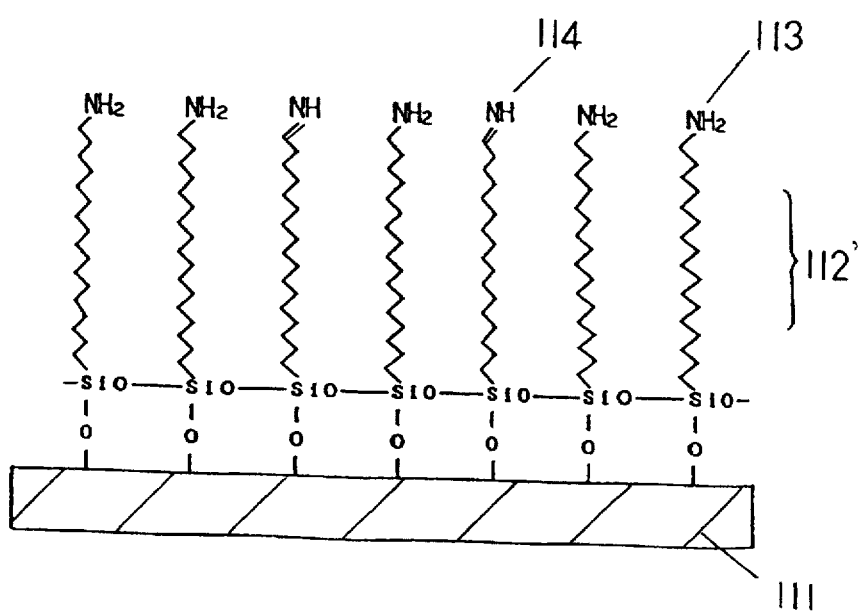

The substrate was irradiated with an energy beam, i.e., an electron beam, in a reactive gas atmosphere (for example irradiation of about 5 Mrads. with an electron beam in a nitrogen atmosphere). As a result, a monomolecular layer an imino group 114 was formed as shown in FIG. 18(c).

This monomolecular film was very firmly chemically (or covalently) bonded to the substrate and did not separate. The monomolecular film was exposed to air containing water vapor (moisture), and the conductive value was about $10^{-8}$ S/cm.

EXAMPLE 12

Figure 19A:
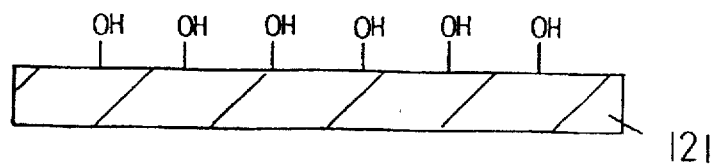
FIGS. 19(a)–(c) are schematic sectional views for explaining a process of manufacture as in example 12 of the invention.
Figure 19B:
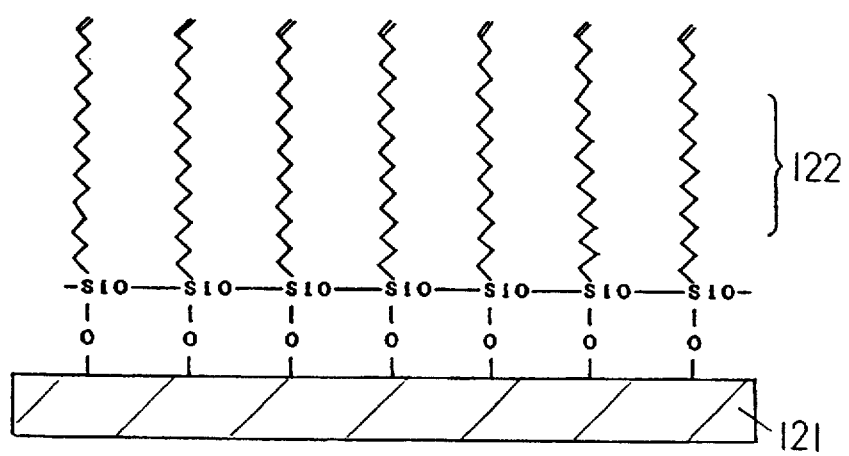
Figure 19C:
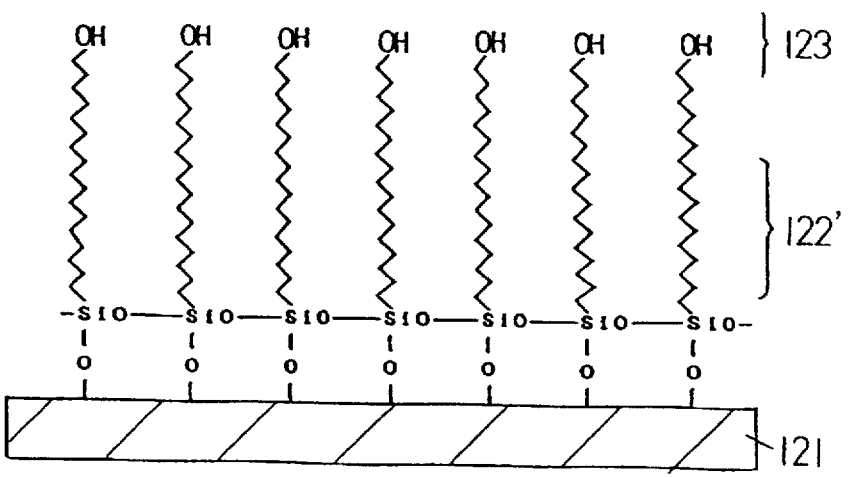

The same experiment as in Example 11 was carried out except that electron beam treatment was carried out in oxygen atmosphere in lieu of a nitrogen atmosphere. As a result, a monomolecular layer 122 (FIG. 19(b)) having a hydroxyl group 123 was formed as shown in FIG. 19(c).

This monomolecular film 122' was very firmly chemically (or covalently) bonded to the substrate and did not separate.

The monomolecular film was exposed to air containing water vapor (moisture), and the conductive value was about $10^{-8}$ S/cm.

EXAMPLE 13

Figure 20A:
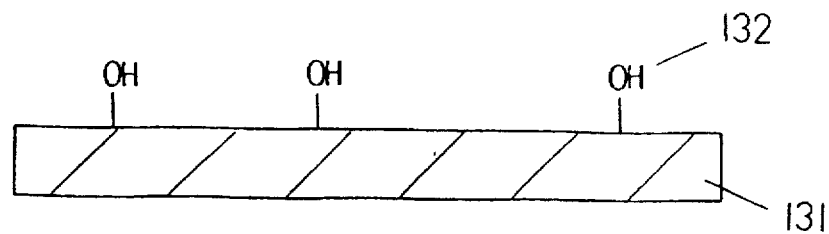
FIGS. 20(a)–(c) are schematic sectional views for explaining a process of manufacture as in example 13 of the invention.
Figure 20B:
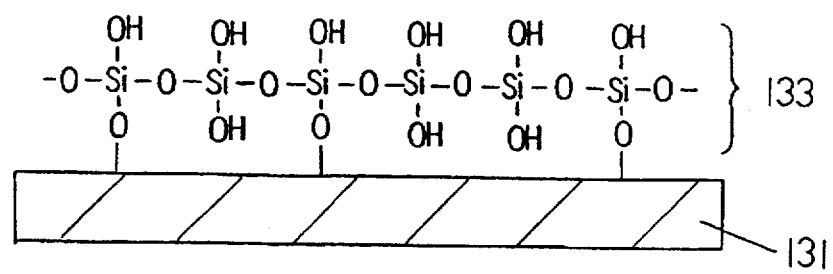

An overhead projector polyester film 131 (surface conductive value of less than $10^{-10}$ S/cm, FIG. 20(a)) was prepared. Where a monomolecular film is to be formed at a high density compared to that of Example 7, a film having been plasma treated is dipped and held for about 30 minutes in a freon 113 solution containing about 1% by weight of $Cl(SiCl_2O)_2SiCl_3$, as the material containing a plurality of trichlorosilyl groups. A dehydrochlorination reaction was brought about on the surface of the film 102 due to a small amount of exposed hydrophilic —OH groups. Thus, molecules represented above in formulas [27] and/or [28] were secured to the surface via —SiO— bonds. By subsequently washing the film with a non-aqueous solvent, e.g., freon-113, and then with water, $Cl(SiCl_2O)_2SiCl_3$ molecules unreacted with the member surface were removed, thus obtaining on the member surface a siloxane monomolecular film 103 as represented above in formulas [29] and/or [30]. The monomolecular inner layer film 133 thus formed was perfectly bonded to the member surface via chemical bonds of —SiO— and did not separate (FIG. 20(b)).

The monomolecular film was completely bonded by chemical bonds of —SiO— to the part surface and did not separate. In addition, its surface contained numerous silanol (—SiOH) bonds corresponding to about 6.5 times as large as the initial number of hydroxyl groups.

Figure 20C:
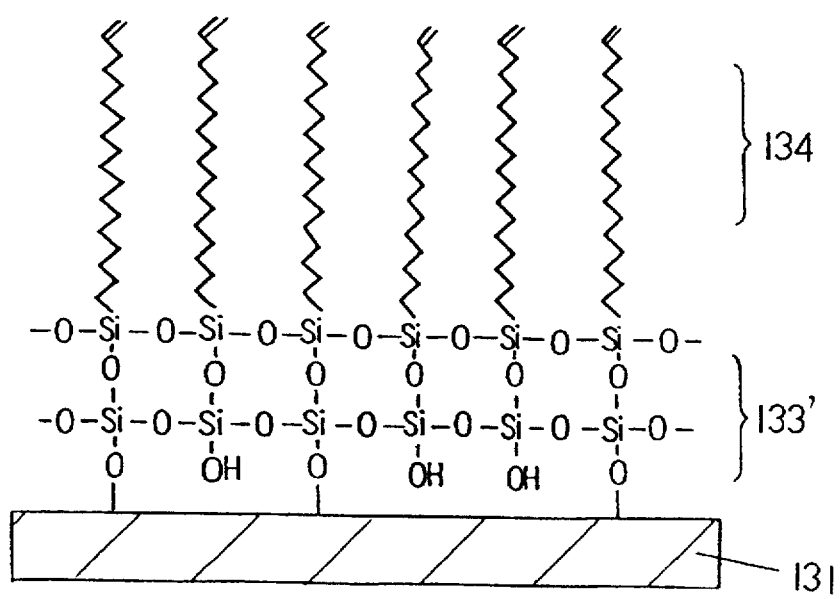
Figure 21:
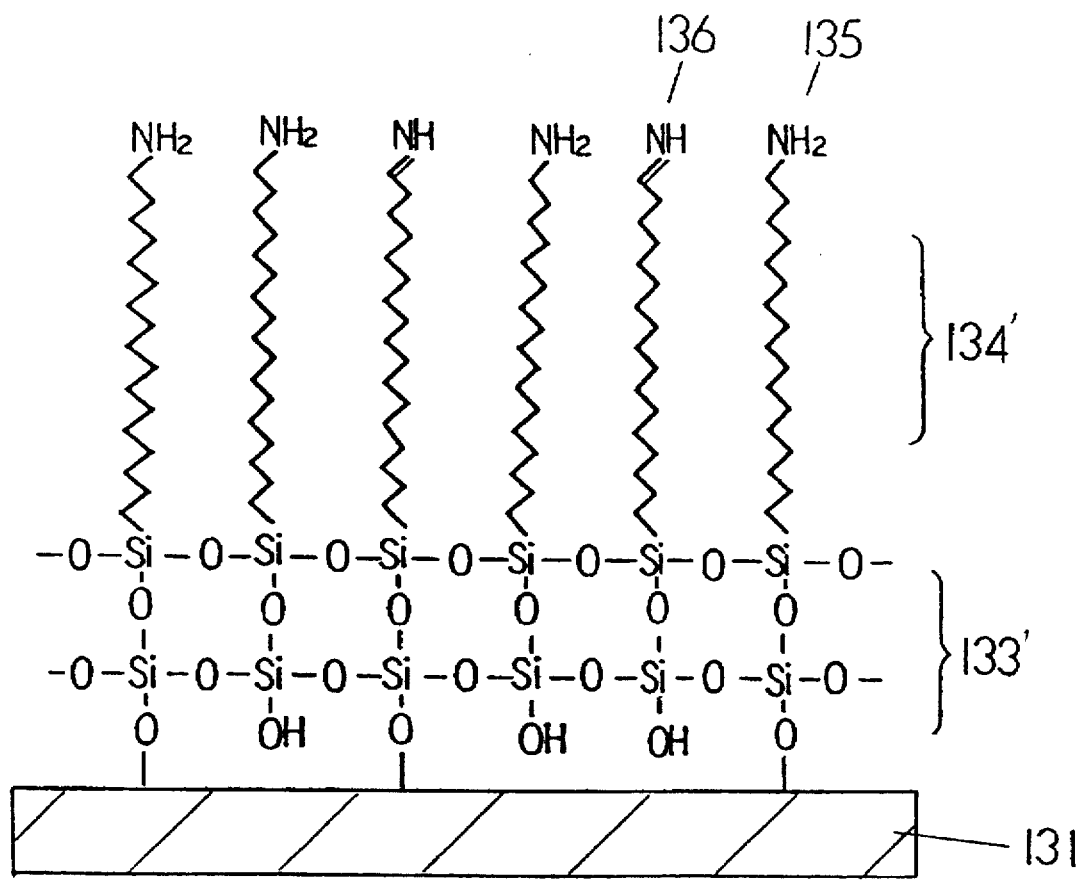
FIG. 21 is a schematic sectional view for explaining a process of manufacture as in example 13 of the invention.

Thereafter, the same experiment in Example 11 was carried out using electron beam treatment in a nitrogen atmosphere. As a result, a monomolecular layer 134 (FIG. 20(c)) having an amino group 135 and/or an imino group 136 was formed as shown in FIG. 21.

This laminated monomolecular film (133' and 134') was very firmly chemically (or covalently) bonded to the substrate and did not separate. The monomolecular film was exposed to air containing water vapor (moisture), and the conductive value was about $10^{-8}$ S/cm.

EXAMPLE 14

Figure 22:
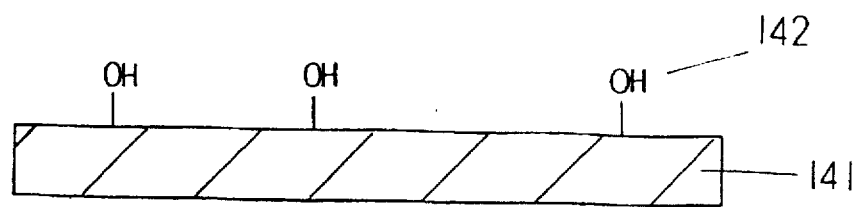
FIGS. 22(a)–(c) are schematic sectional views for explaining a process of manufacture as in example 14 of the invention.
Figure 22:
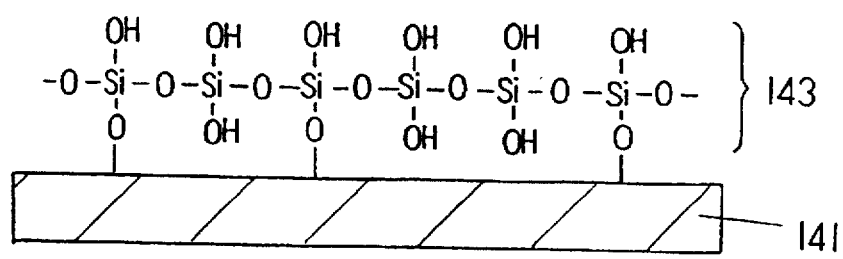
Figure 22:
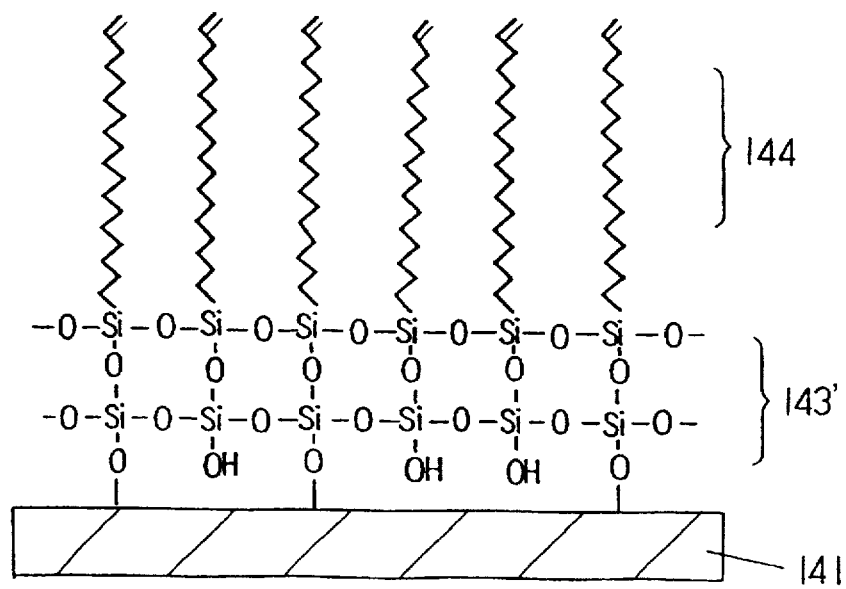
Figure 23:
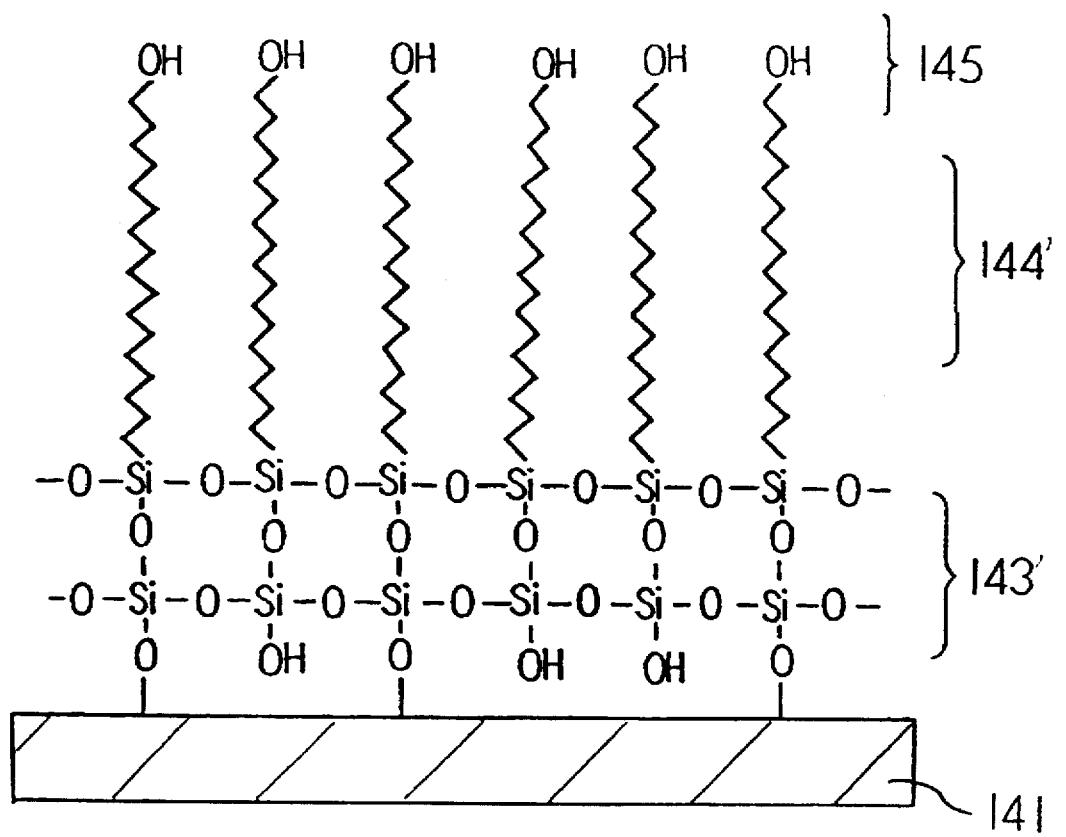
FIG. 23 is a schematic sectional view for explaining a process of manufacture as in example 14 of the invention.

The same experiment as in Example 13 was carried out except that electron beam treatment was carried out in an oxygen atmosphere in a lieu of in nitrogen atmosphere. As a result, a monomolecular layer 144' (FIG. 22(c)) having a hydroxyl group 145 was formed as shown in FIG. 23.

This laminated monomolecular film 143' and 144' was very firmly chemically (or covalently) bonded to the substrate and did not separate. The laminated monomolecular film was exposed to air containing water vapor (moisture), and the conductive value was about $10^{-8}$ S/cm.

EXAMPLE 15

A CRT glass face plate substrate 11 (surface conductive value of about $10^{-17}$ S/cm, FIG. 1(a)) was prepared, washed with an organic solvent and then dipped and held for about five hours in a non-aqueous solution containing an adsorbed material having an ester ($R-COOCH_2-$, R represents a functional group) bond and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of $H_3COOC(CH_2)_7SiCl_3$.

A dehydrochlorination reaction was thus brought about between chlorosilyl (—SiCl) groups in the material containing an ester bond and a chlorosilyl group and hydroxyl groups 12 contained numerously at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as above in the formula [1]. Drying temperature may be room temperature or above.

A monomolecular film 13 containing ester bonds thus was formed. The film was chemically bonded (or covalently bonded to the substrate surface. The formation of chemically adsorbed monomolecular film was confirmed by FTIR spectroscopy and the thickness was about 2.0 nm (FIG. 1(b)).

The treated substrate was then reacted in an ether solution containing several per cent by weight of lithium aluminium hydride (LiAlH$_4$) at a temperature below room temperature for 20 minutes to introduce hydrophilic hydroxyl end groups so as to form a monomolecular film 14 (FIG. 1(c)) represented above in the formula [2].

The monomolecular film 14 was very firmly chemically bonded (or covalently bonded) to the substrate and did not separate. The monomolecular film 14 was exposed to air containing water vapor (moisture), and the conductive value was about $10^{-8}$ S/cm.

The substrate was further dipped in a hexane solution containing an organic compound of an alkali metal, e.g., 5% by weight of LiO(CH$_2$)$_3$CH$_3$ (or NaOCH$_3$) to form a very lighly hydrophilic film 15 (FIG. 1(d)) represented above in the formula [3]. The monomolecular film 15 was exposed to air containing water vapor (moisture), and the conductive value was about $10^{-6}$ S/cm.

The example formed the chemical adsorbed monomolecular film after assembly of the CRT face plate. The chemical adsorbed monomolecular film can also be formed before assembly of the CRT face plate.

EXAMPLE 16

A liquid-crystal display glass flat plate 21 was prepared (FIG. 2(a)), washed well and dipped and held for about five hours in a non-aqueous solution containing an adsorbed material having an ester bond and a chlorosilyl group e.g., a mixed solution of 80% by weight of n-hexadecane (or toluene, xylene or bicyclohexyl), 12% by weight of carbon tetrachloride, and 8% by weight of chloroform, containing about 2% by weight of H$_3$COOC(CH$_2$)$_{10}$SiCl$_3$.

A dehydrochlorination reaction was thus brought about between the chlorosilyl (—SiCl) groups in the material and the hydroxyl groups 22 numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying as above in the formula [4]. Drying temperature may be room temperature or above.

A monomolecular film 23 containing ester bonds thus was formed. The film was chemically (or covalently) bonded to the substrate surface, and its thickness was about 3.0 nm (FIG. 2(b)).

The treated substrate was then reacted in a solution containing 36% by weight of hydrochloric acid (HCl) at 65° C. for 30 minutes, thus introducing hydrophilic carboxyl end groups as represented above in the formula [5].

A monomolecular film 24 (FIG. 2(c)) was thus formed. The monomolecular film 24 was exposed to air containing water vapor (moisture), and the conductive value was about $10^{-9}$ S/cm. This film was very firmly chemically (or covalently) bonded and did not separate.

The substrate was then further dipped and held in an aqueous solution containing an alkali or an alkali earth or an other metal compound, e.g., NaOH (or Ca(OH )$_2$), thus, bonds were formed as above in the formula [6].

A highly hydrophilic monomolecular film 25 (FIG. 2(d)) thus was formed on the substrate surface. The monomolecular film 24 was exposed to air containing water vapor (moisture), and the conductive value was about $10^{-6}$ S/cm. This film did not separate by washing.

The example formed a chemically adsorbed monomolecular film after assembly of the liquid-crystal display face plate. The chemically adsorbed monomolecular film can also be formed before assembly of the liquid-crystal display face plate.

EXAMPLE 17

A CRT glass face plate substrate 31 (FIG. 3(a)) was prepared. The substrate was dipped and held at 80° C. for about 30 minutes in a water solution containing a bichromic acid and washed with water. The substrate 31 was washed with an organic solvent, and then the substrate was dipped and held for about two hours in a non-aqueous solution containing an adsorbed material having a cyano and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of NC(CH$_2$)$_{17}$SiCl$_3$.

A dehydrochlorination reaction was thus brought about between —SiCl groups in the adsorbed material having the cyano and chlorosilyl groups and the hydroxyl groups 32 numerously contained at the substrate surfaces. The substrate was then washed with chloform to remove unreacted material remaining on the surface, followed by washing with water or exposing to air containing moisture. The residual —SiCl group was changed to a —SiOH group. Each silanol group was then dehydrated and crosslinked to form a siloxane bond after drying above in the formula [7]. Drying temperature may be room temperature or above.

A monomolecular film 33 containing cyano groups thus was formed. The film was chemically (or covalently) bonded to the substrate surface (FIG. 3(b)).

The treated substrate was then dipped and held in ether containing dissolved lithium aluminium hydride (10 mg/ml) for overnight reaction. Then, the substrate was taken out from the solution and added to an ether solution containing 10% by weight hydrochloric acid. Thereafter, the substrate was dipped and held in a triethylamine solution for two hours. The substrate was then washed with chloroform. A highly hydrophilic monomolecular film 34 (FIG. 3(c)) represented as above in the formula [8] was formed.

This film was firmly chemically (or covalently) bonded to the substrate and did not separate. The monomolecular film 34 was exposed to air containing water vapor (moisture), and the conductive value was about $10^{-9}$ S/cm. The formation of chemically adsorbed monomolecular film was confirmed by FTIR spectroscopy and the thickness was about 2.5 nm.

In another example of —NH$_2$ group introduction, a CRT glass face plate substrate was prepared, washed with an organic solvent and dipped and held for about two hours in a non-aqueous solution containing a bromo (or iodo) and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of Br(CH$_2$)$_{17}$SiCl$_3$.

A dehydrochlorination reaction was thus brought about between —SiCl groups in the material containing the bromo (or iodo) and chlorosilyl groups and the hydroxyl groups contained numerously at the substrate surface. The substrate was then washed with freon 113 to remove unreacted material remaining on the surface, followed by washing with water or exposing to air containing moisture. The residual —SiCl group was changed to a —SiOH group. Each silanol group was then decrosslinked crosslinked to form a siloxane bond after drying as above in the formula [9]. Drying temperature may be room temperature or above.

A monomolecular film containing bromo groups thus was formed over the entire substrate surface. The film was chemically (or covalently) bonded to the substrate surface. The treated substrate was then dipped in an N,N-dimethyl formamide solution containing dissolved sodium amide (8 mg/ml) for overnight reaction. A monomolecular film as represented above in the formula [10] was obtained.

The substrate was then dipped and held in ether containing dissolved lithium aluminium hydride (10 mg/ml) for overnight reaction, and then put into an empty container for addition thereto of an ether solution containing 10% by weight hydrochloric acid. Subsequently, the substrate was dipped and held in a triethylamine solution for two hours. The substrate was then washed with chloroform after drying as above in the formula [11] was formed.

This monomolecular film was very firmly chemically (or covalently) bonded to the substrate and did not separate by wiping. The monomolecular film 34 was exposed to air containing water vapor (moisture), and the conductive value was about $10^{-9}$ S/cm.

EXAMPLE 18

Figure 4:
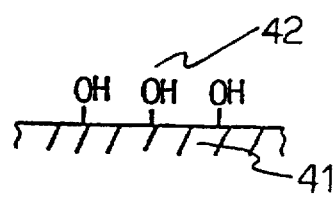
FIGS. 4(a)–(d) are schematic sectional views for explaining a process of manufacture as in examples 4, 18 and 24 of the invention.
Figure 4:
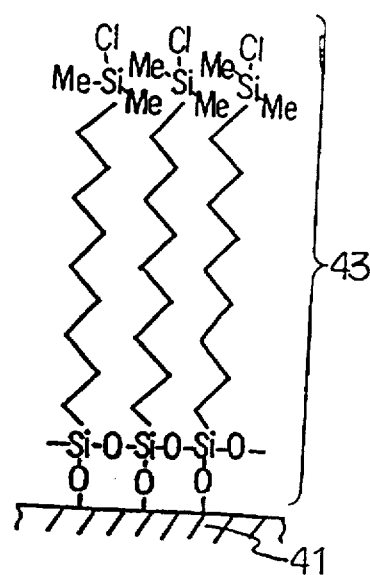
Figure 4:
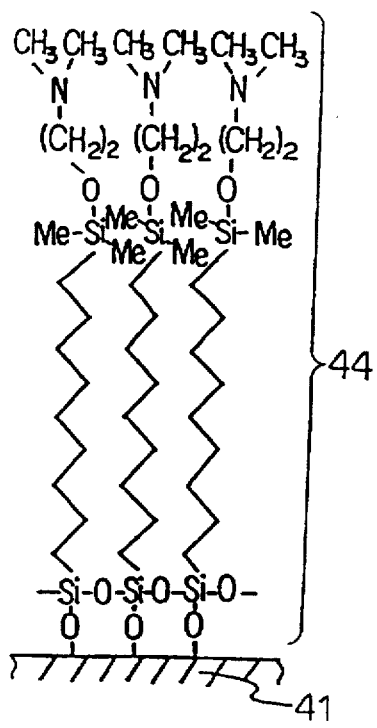
Figure 4:
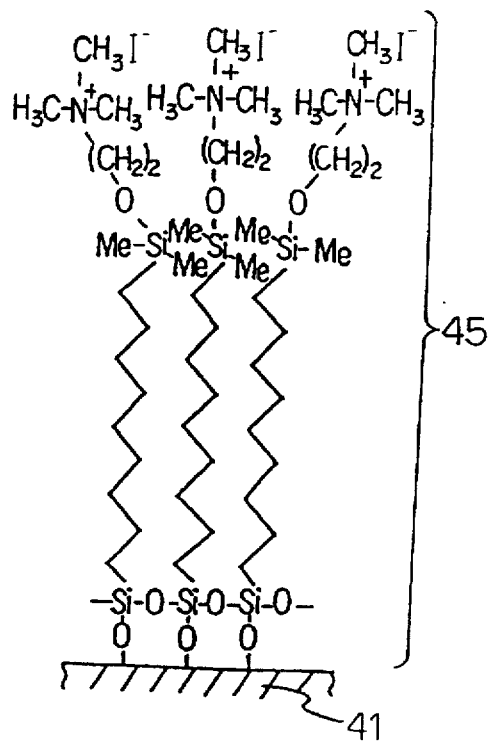

A CRT glass face plate substrate 41 (FIG. 4(a)) was prepared. The substrate was dipped and held for five hours in a non-aqueous solution containing an adsorbed material having a chlorosilyl group at each end e.g., a mixed solution of 80% by weight of n-hexadecane (or toluene, xylene or bicyclohexyl), 12% by weight of carbon tetrachloride, and 8% by weight of chloroform, containing about 2% by weight of ClSi(CH$_3$)$_2$(CH$_2$)$_{10}$SiCl$_3$.

A dehydrochlorination reaction was brought about between chlorosilyl (—SiCl) groups in the material containing the chlorosilyl groups at each end and the hydroxyl groups numerously contained at the substrate surface. The substrate was then washed with chloroform to remove unreacted material remaining on the surface. Thus, bonds formed as above in the formula [12] were produced over the entire substrate surface.

A monomolecular film 43 containing chlorosilyl groups thus was formed. The film was chemically (or covalently) bonded to the substrate surface (FIG. 4(b)). The treated substrate was then dipped in a chloroform solution containing 10% by weight of (CH$_3$)$_2$N(CH$_2$)$_2$OH causing a dehydrochlorination reaction. The substrate was then washed with chloroform. Thus, a monomolecular film 44 represented above in the formula [13] was obtained (FIG. 4(c)).

The substrate was then further dipped in a chloroform solution containing CH$_3$I two hours. Thus, a very highly hydrophilic monomolecular film 45 was obtained (FIG. 4(d)), which contained quarternary amino groups at the surface, as represented above in the formula [14].

This monomolecular film was very firmly chemically (or covalently) bonded to the substrate and did not separate by wiping. The monomolecular film 45 was exposed to air containing water vapor (moisture), and the conductive value was about $10^{-7}$ S/cm.

EXAMPLE 19

A CRT glass face plate substrate 51 (FIG. 5(a)) was prepared. The substrate was dipped and held for about five hours in a non-aqueous solution containing an adsorbed material having a bromo (or iodo) and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of above formula [15].

A dehydrochloroination reaction was thus brought about between chlorosilyl (—SiCl) groups in the material containing the bromo (or iodo) and chlorosilyl groups and the hydroxyl groups 52 numerously contained at the substrate surface. The substrate was then washed with chloroform to remove unreacted material remaining on the surface. Thus, bonds formed above as in the formula [16] were produced over the entire substrate surface.

A monomolecular film 53 containng bromo groups thus was formed. The film was chemically (or covalently) bonded to the substrate surface, and its thickness was about 2.5 nm (FIG. 5(b)).

The treated substrate was then reacted in an alkaline aqueous solution containing 5% by weight of AgNO$_3$ at 80° C. for two hours. Thus, a hydrophilic monomolecular film 54 (FIG. 5(c)) represented above as in the formula [17] was obtained.

This monomolecular film was very firmly chemically (or covalently) bonded to the substrate and did not separate. The monomolecular film 54 was exposed to air containing water vapor (moisture), and the conductive value was about $10^{-10}$ S/cm.

EXAMPLE 20

A CRT glass face plate substrate 61 (FIG. 6(a)) was prepared. The substrate 61 was washed with an organic solvent, and was dipped and held for about two hours in a nonaqueous solution containing an adsorbed material, e.g., a mixed solution of 80% by weight of n-hexadecane (or toluene, xylene or bicyclohexyl), 12% by weight of carbon tetrachloride, and 8% by weight of chloroform, containing about 2% by weight of NCS(CH$_2$)$_{10}$SiCl$_3$.

A dehydrochlorination reaction was thus brought about between —SiCl groups in the adsorbed material containing the thiocyano and chlorosilyl groups and the hydroxyl groups 62 numerously contained at the substrate surface. The substrate was then washed with chloroform to remove unreacted material remaining on the surface, followed by washing with water or exposing to air containing moisture. The residual —SiCl group was changed to a —SiOH group. Each silanol group was then dehydrated and crosslinked to form a siloxane bond after drying above in the formula [18]. Drying temperature may be room temperature or above.

A monomolecular film 63 containing thiocyano groups thus was formed. The film was chemically (or covalently) bonded to the glass surface. Its thickness was about 2.5 nm (FIG. 6(b)).

The treated glass substrate was then dipped in ether containing lithium aluminum halide dissolved therein (10 mg/ml) for four hours. Thus, a hydrophilic monomolecular film 64 (FIG. 6(c)) as represented above in the formula [19] was obtained.

The treated glass substrate thus obtained was further dipped in a mixed solution containing 10% by weight of hydrogen peroxide and 10% by weight of acetic acid in a volume ratio of 1:5 at a temperature of 40° to 50° C. for 30 minutes. Thus, a highly hydrophilic monmolecular film 65 (FIG. 6(d)) as represented above in the formula [20] was obtained.

This monomolecular film was very firmly chemically (or covalently) bonded to the substrate and did not separate. The monomolecular film 65 was exposed to air containing water vapor (moisture), and the conductive value was about $10^{-8}$ S/cm.

The glass substrate was then further dipped and held in an aqueous solution containing an alkali or an alkali earth or an other metal compound, e.g., containing 2% by weight of NaOH (or Ca(OH)$_2$). Thus, bonds were formed above as in the formula [21]. The monomolecular film 65 was exposed to air containing water vapor (moisture), and the conductive value was about $10^{-7}$ S/cm.

As has been described, with the method of the above embodiment, antistatic hydrophilic functional groups are secured to the CRT display screen surface via molecules chemically adsorbed to the surface by chemical bonds. It is thus possible to form comparatively freely a charge-proof chemically adsorbed monomolecular film having a desired conductivity on the display screen surface. That is, weakly conductive functional groups are secured via chemically adsorbed molecules and by chemical bonds to the CRT display screen surface. Thus, it is possible to prevent charging of the CRT display screen surface. In addition, since the monomolecular film is secured by chemical bonds, it does not separate. Further, since the film has a thickness at the nanometer level, it does not deteriorate the image on the display screen. It is thus possible to preclude contamination of the CRT display screen surface due to electrostatic charging thereof.

EXAMPLE 21

A light-emitting tube, for example, a glass fluorescent lamp substrate 11 (surface conductive value was about $10^{-17}$ S/cm, FIG. 1(a)) was prepared, washed with an organic solvent and then dipped and held for about five hours in a non-aqueous solution containing an adsorbed material having an ester (R—COOCH$_2$—, R represents a functional group) bond and a chlorosilyl group, e.g., a mixed solution of 80% by weight of n-hexadecane (or toluene, xylene or dicyclohexane), 12% by weight of carbon tetrachloride, and 8% by weight of chloroform, containing about 2% by weight of H$_3$COOC(CH$_2$)$_7$SiCl$_3$.

A dehydrochlorination reaction was thus brought about between chlorosilyl (—SiCl) groups in the material containing an ester bond and a chlorosilyl group and hydroxyl groups 12 contained numerously at the substrate surface. The substrate was then washed with chloroform to remove unreacted material remaining on the surface, followed by washing with water or exposing to air containing moisture. The residual —SiCl groups were changed to —SiOH groups. Each silanol group was then dehydrated and crosslinked to form a siloxane bond after drying as above in the formula [1]. Drying temperature may be room temperature or above.

A monomolecular film 13 containing ester bonds thus was formed. The film was chemically bonded (or covalently bonded) to the substrate surface. The formation of the chemically adsorbed monomolecular film was confirmed by FTIR spectroscopy and the thickness was about 2.0 nm (FIG. 1(b)).

The treated substrate was then reacted in an ether solution containing several per cent by weight of lithium aluminium hydride (LiAlH$_4$) at a temperature below room temperature for 20 minutes to introduce hydrophilic hydroxyl end groups so as to form a monomolecular film 14 (FIG. 1(c)) the represented above in the formula [2].

The monomolecular film 14 was very firmly chemically bonded (or covalently bonded) to the substrate and did not separate. The monomolecular film 14 was exposed to air containing water vapor (moisture), and the conductive value was about $10^{-8}$ S/cm.

The substrate was further dipped in a hexane solution containing an organic compound of an alkali metal, e.g., 5% by weight of LiO(CH$_2$)$_3$CH$_3$ (or NaOCH$_3$) to form a very highly hydrophilic film 15 (FIG. 1(d)) represented as above in the formula [3]. The monomolecular film 15 was exposed to air containing water vapor (moisture), and the conductive value was about $10^{-6}$ S/cm.

The example formed the chemical adsorbed monomolecular film after assembly of the fluorescent lamp. The chemical adsorbed monomolecular film can also be formed before assembly of the fluorescent lamp.

EXAMPLE 22

A glass electric lamp 21 was prepared (FIG. 2(a)), washed well and dipped and held for about five hours in a non-aqueous solution containing an adsorbed material having an ester bond and a chlorosilyl group e.g., a mixed solution of 80% by weight of n-hexadecane (or toluene, xylene or bicyclohexyl), 12% by weight of carbon tetrachloride, and 8% by weight of chloroform, containing about 2% by weight of H$_3$COOC(CH$_2$)$_{10}$SiCl$_3$.

A dehydrochlorination reaction was thus brought about between the chlorosilyl (—SiCl) groups in the material and the hydroxyl groups 22 numerously contained at the substrate surface. The substrate was then washed with chlofolm to remove unreacted material remaining on the surface, followed by washing with water or exposing to air containing moisture. The residual —SiCl groups were changed to —SiOH groups. Each silanol group was then dehydrated and crosslinked to form a siloxane bond after drying as above in the formula [4]. Drying temperature may be room temperature or above.

A monomolecular film 23 containing ester bonds thus was formed. The film was chemically (or covalently) bonded to the substrate surface, and its thickness was about 2.0 nm (FIG. 2(b)).

The treated substrate was then reacted in a solution containing 36% by weight of hydrochloric acid (HCl) at 65° C. for 30 minutes, thus introducing hydrophilic carboxyl end groups as represented above in the formula [5].

A monomolecular film 24 (FIG. 2(c)) was thus formed. The monomolecular film 24 was exposed to air containing water vapor (moisture), and the conductive value was about $10^{-9}$ S/cm. This film was very firmly chemically (or covalently) bonded and did not separate.

The substrate was then further dipped and held in an aqueous solution containing an alkali or an alkali earth or an other metal compound, e.g., NaOH (or Ca(OH)$_2$). Thus, bonds were formed as above in the formula [6].

A highly hydrophilic monomolecular film 25 (FIG. 2(d)) thus was on the substrate surface. The monomolecular film 24 was exposed to air containing water vapor (moisture), and the conductive value was about $10^{-6}$ S/cm. This film did not separate by washing.

The example formed the chemical adsorbed monomolecular film after assembly of the electric lamp. The chemical adsorbed monomolecular film can be formed before assembly of the electric lamp.

EXAMPLE 23

A glass fluorescent lamp 31 (FIG. 3(a)) was prepared as a substrate. The substrate was dipped and held at 80° C. for about 30 minutes in a water solution containing bichromic acid and washed with water. The substrate 31 was washed with an organic solvent, and was dipped and held for about two hours in a non-aqueous solution containing an adsorbed material having a cyano and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of $NC(CH_2)_{17}SiCl_3$.

A dehydrochlorination reaction was thus brought about between —SiCl groups in the adsorbed material containing the cyano and chlorosilyl groups and the hydroxyl groups 32 numerously contained at the substrate surfaces. The substrate was then washed with chloform to remove unreacted material remaining on the surface, followed by washing with water or exposing to air containing moisture. The residual —SiCl groups were changed to —SiOH groups. Each silanol group was then dehydrated and crosslinked to form a siloxane bond after drying above in the formula [7]. Drying temperature may be room temperature or above.

A monomolecular film 33 containing cyano groups thus was formed. The film was chemically (or covalently) bonded to the substrate surface (FIG. 3(b)).

The treated substrate was then dipped and held in ether containing dissolved lithium aluminium hydride (10 mg/ml) for overnight reaction. Then, the substrate was taken out from the solution and added to an ether solution containing 10% by weight hydrochloric acid. Thereafter, the substrate was dipped and held in a triethylamine solution for two hours. The substrate was then washed with chloroform. A highly hydrophilic monomolecular film 34 (FIG. 3(c)) is represented above in the formula [8] was formed.

This film was firmly chemically (or covalently) bonded to the substrate and did not separate. The monomolecular film 34 was exposed to air containing water vapor (moisture), and the conductive value was about $10^{-9}$ S/cm. The formation of the chemically adsorbed monomolecular film was measured by FTIR spectrometry and the thickness was about 2.5 nm.

As another example of —NH$_2$ group introduction, a CRT glass face plate substrate was prepared, washed with an organic solvent and dipped and held for about two hours in a non-aqueous solution containing a bromo (or iodo) and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of $Br(CH_2)_{17}SiCl_3$.

A dehydrochlorination reaction was thus brought about between —SiCl groups in the material containing the bromo (or iodo) and chlorosilyl groups and the hydroxyl groups contained numerously at the substrate surface. The substrate was then washed with freon 113 to remove unreacted material remaining on the surface, followed by washing with water or exposing to air containing moisture. The residual —SiCl groups were changed to —SiOH groups. Each silanol group was then dehydrated and crosslinked to form a siloxane bond after drying as above in the formula [9]. Drying temperature may be room temperature or above.

A monomolecular film containing bromo groups thus was formed over the entire substrate surface. The film was chemically (or covalently) bonded to the substrate surfaces. The treated substrate was then dipped and held together with an N,N-dimethyl formamide solution containing dissolved sodium amide (8 mg/ml) for overnight reaction. A monomolecular film as represented above in the formula [10] was obtained.

The substrate was then dipped and held in ether containing dissolved lithium aluminium hydride (10 mg/ml) for overnight reaction, and then put into an empty container for addition thereto of an ether solution containing 10% by weight hydrochloric acid. Subsequently, the substrate was dipped and held in a triethylamine solution for two hours. The substrate was then washed with chloroform after drying as above in the formula [11].

This monomolecular film was very firmly chemically (or covalently) bonded to the substrate and did not separate by wiping. The monomolecular film 34 was exposed to air containing water vapor (moisture), and the conductive value as about $10^{-9}$ S/cm.

EXAMPLE 24

A glass fluorescent lamp 41 (FIG. 4(a)) was prepared. The lamp was dipped and held for five hours in a non-aqueous solution containing an adsorbed material having a chlorosilyl group at each end e.g., a mixed solution of 80% by weight of n-hexadecane (or toluene, xylene or bicyclohexyl), 12% by weight of carbon tetrachloride, and 8% by weight of chloroform, containing about 2% by weight of $Cl\,Si(CH_3)_2(CH_2)_{10}SiCl_3$.

A dehydrochlorination reaction was brought about between chlorosilyl (—SiCl) groups in the material containing the chlorosilyl group at each end and the hydroxyl groups numerously contained at the lamp surface. The substrate was then washed with chloroform to remove unreacted material remaining on the surface. Thus, bonds formed as above in the formula [12] were produced over the entire lamp surface.

A monomolecular film 43 containing chlorosilyl groups thus was formed. The film was chemically (or covalently) bonded to the lamp surface (FIG. 4(b)). The treated lamp was then dipped in a chloroform solution containing 10% by weight of $(CH_3)_2N(CH_2)_2OH$ causing a dehydrochlorination reaction. The lamp was then washed with chloroform. Thus, a monomolecular film 74 represented above as in the formula [13] was obtained (FIG. 4(c)).

The lamp was then further dipped in a chloroform solution containing $CH_3I$ for two hours. Thus, a very highly hydrophilic monomolecular film 45 was obtained (FIG. 4(d)), which contained quarternary amino groups at the lamp surface, as represented above in the formula [14].

This monomolecular film was very firmly chemically (or covalently) bonded to the lamp and did not separate by wiping. The monomolecular film 45 was exposed to air containing water vapor (moisture), and the conductive value was about $10^{-7}$ S/cm.

EXAMPLE 25

A glass fluorescent lamp 51 (FIG. 5(a)) was prepared. The lamp was dipped and held for about five hours in a nonaqueous solution containing an adsorbed material having a bromo (or iodo) and a chlorosilyl group, e.g., a mixed solution of 80% by weight of n-hexadecane (or toluene, xylene or bicyclohexyl), 12% by weight of carbon tetrachloride, and 8% by weight of chloroform, containing about 2% by weight of above formula [15].

A dehydrochloroination reaction was thus brought about between chlorosilyl (—SiCl) groups in the material containing the bromo (or iodo) and chlorosilyl groups and the hydroxyl groups 52 numerously contained at the lamp surface. The substrate was then washed with chloroform to remove unreacted material remaining on the surface. Thus, bonds formed above as in the formula [16] were produced over the entire lamp surface.

A monomolecular film 53 containing bromo groups thus was formed. The film was chemically (or covalently) bonded to the lamp surface, and its thickness was about 2.5 nm (FIG. 5(b)).

The treated lamp was then reacted in an alkaline aqueous solution containing 5% by weight of $AgNO_3$ at 80° C. for two hours. Thus, a hydrophilic monomolecular film 54 (FIG. 5(c)) as represented above in the formula [17] was obtained.

This monomolecular film was very firmly chemically (or covalently) bonded to the lamp and did not separate. The monomolecular film 54 was adsorbed to air containing water vapor (moisture), and the conductive value was about $10^{-10}$ S/cm.

EXAMPLE 26

A extra high pressure mercury lamp substrate 61 (FIG. 6(a)) was prepared. The substrate 61 was washed with an organic solvent, and was dipped and held for about two hours in a non-aqueous solution containing an adsorbed material, e.g., a mixed solution of 80% by weight of n-hexadecane (or toluene, xylene or bicyclohexyl), 12% by weight of carbon tetrachloride, and 8% by weight of chloroform, containing about 2% by weight of $NCS(CH_2)_{10}SiCl_3$. A dehydrochlorination reaction was thus brought about between the —SiCl groups in the adsorbed material containing the thiocyano and chlorosilyl groups and the hydroxyl groups 62 numerously contained at the substrate surface. The substrate was then washed with chloroform to remove unreacted material remaining on the surface, followed by washing with water or exposing to air containing moisture. The residual —SiCl groups were changed to —SiOH groups. Each silanol group was then dehydrated and crosslinked to form a siloxane bond after drying as above in the formula [18]. Drying temperature may be room temperature or above.

A monomolecular film 63 containing thiocyano groups thus was formed. The film was chemically (or covalently) bonded to the glass surface. Its thickness was about 2.5 nm (FIG. 6(b)).

The treated glass substrate was then dipped in ether containing lithium aluminum halide dissolved therein (10 mg/ml) for four hours. Thus, a hydrophilic monomolecular film 64 (FIG. 6(c)) represented above in the formula [19] was obtained.

The treated glass substrate thus obtained was further dipped in a mixed solution containing 10% by weight of hydrogen peroxide and 10% by weight of acetic acid in a volume ratio of 1:5 at a temperature of 40° to 50° C. for 30 minutes. Thus, a highly hydrophilic monomolecular film 65 (FIG. 6(d)) as represented above in the formula [20] was obtained.

This monomolecular film was very firmly chemically (or covalently) bonded to the substrate and did not separate. The monomolecular film 65 was exposed to air containing water vapor (moisture), and the conductive value was about $10^{-8}$ S/cm.

The glass substrate was then further dipped and held in an aqueous solution containing an alkali or an alkali earth to an other metal compound, e.g., containing 2% by weight of NaOH(or $Ca(OH)_2$). Thus, bonds were formed as above in the formula [21]. The monomolecular film 65 was exposed to air containing water vapor (moisture), and the conductive value was about $10^{-7}$ S/cm.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. An antistatic film-containing substrate, said antistatic film comprising a chemically adsorbed film having an electrical conductivity of at least $10^{-10}$ S/cm and comprising straight carbon chain molecules each containing π-conjugated groups and a terminal electrically conductive functional group which is at least one functional group selected from the group consisting of —COOH, —NO$_2$, —SH, —SO$_3$H, and —N$^+$(CH$_3$)$_3$X, where X represents a halogen atom, wherein (i) said substrate onto which the antistatic film is provided, is a chargeable substrate having hydrophilic surface groups and an electrical conductivity of less than $10^{-10}$ S/cm, and (ii) each of said electrically conductive functional groups is bonded to said substrate via said straight carbon chain molecules and a Si group.

2. The antistatic film according to claim 1, wherein the hydrogen atom in said —COOH or —SO$_3$H is substituted by an alkali, an alkali earth or another metal.

3. The antistatic film according to claim 1, wherein said chemically adsorbed film is an electrically conductive film having an electrical conductivity of $10^{-5}$ S/cm or above.

4. The antistatic film according to claim 3, wherein said electrically conductive chemically adsorbed film is formed on said substrate via a chemically adsorbed inner layer film containing a siloxane.

5. The antistatic film according to claim 1, wherein said chemically adsorbed film is a monomolecular or polymer adsorbed film.

6. The antistatic film according to claim 1, wherein said Si group is —SiO— or —SiN—.

7. The antistatic film according to claim 1, wherein said substrate is a display screen surface.

8. The antistatic film according to claim 1, wherein said substrate is a light-emitting tube.

9. The substrate according to claim 1 wherein the chemically adsorbed film comprises at least one monomolecular film.

* * * * *